US012767769B2

(12) United States Patent
Davies et al.

(10) Patent No.: US 12,767,769 B2
(45) Date of Patent: Oct. 20, 2026

(54) METHODS OF MAKING MONODISPERSE POPULATIONS OF POLYARYLKETONE OR POLYARYLTHIOETHERKETONE PARTICLES

(71) Applicant: Agilent Technologies, Inc., Santa Clara, CA (US)

(72) Inventors: John William Davies, Shrewsbury (GB); Thomas Jacob Cobb, Shrewsbury (GB)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 947 days.

(21) Appl. No.: 17/877,840

(22) Filed: Jul. 29, 2022

(65) Prior Publication Data

US 2023/0051959 A1 Feb. 16, 2023

Related U.S. Application Data

(60) Provisional application No. 63/227,341, filed on Jul. 30, 2021.

(51) Int. Cl.

| | |
|---|---|
| ***C08J 3/14*** | (2006.01) |
| ***C08G 65/40*** | (2006.01) |
| ***C08G 65/48*** | (2006.01) |

(52) U.S. Cl.

CPC ............ *C08J 3/14* (2013.01); *C08G 65/4056* (2013.01); *C08G 65/48* (2013.01); *C08G 2650/40* (2013.01); *C08J 2371/00* (2013.01)

(58) Field of Classification Search

CPC ..... C08J 3/14; C08J 2371/00; C08G 65/4056; C08G 65/48; C08G 2650/40

USPC .......................................................... 528/127

See application file for complete search history.

(56) References Cited

U.S. PATENT DOCUMENTS

| | | | |
|---|---|---|---|
| 4,714,748 | A | 12/1987 | Hoashi |
| 4,868,240 | A | 9/1989 | Ichikawa |
| 4,880,843 | A | 11/1989 | Stein |
| 5,247,052 | A | 9/1993 | Lucke et al. |
| 5,357,040 | A | 10/1994 | McGrath |
| 5,651,931 | A | 7/1997 | Bailey |
| 6,395,183 | B1 | 5/2002 | Valaskovic et al. |

(Continued)

FOREIGN PATENT DOCUMENTS

| | | | |
|---|---|---|---|
| CN | 103551130 | A | 2/2014 |
| CN | 109135175 | A | 1/2019 |

(Continued)

OTHER PUBLICATIONS

Ewing, Z., Synthesis and characterization of PEEK analogues utilizing 3, 5-and 2, 4-difluorobenzophenone, 2016, Wright State University.

(Continued)

*Primary Examiner* — David T Karst

(74) *Attorney, Agent, or Firm* — Lando & Anastasi, LLP

(57) ABSTRACT

The invention provides methods for making substantially monodisperse populations of substantially spherical particles of polyarylketone polymers or of thio-analogues of such polymers, of selected sizes. Populations of such particles can be used, for example, to form porous devices with greater control of porosity than previously available. In some embodiments, the porous devices are frits, filters, membranes or monoliths.

3 Claims, 17 Drawing Sheets

Exemplar PEEK frit "PF14"

(56) References Cited

U.S. PATENT DOCUMENTS

| | | | |
|---|---|---|---|
| 2003/0038068 A1 | 2/2003 | Myers | |
| 2007/0295663 A1 | 12/2007 | Iraneta et al. | |
| 2008/0197065 A1 | 8/2008 | Wingo et al. | |
| 2009/0001007 A1 | 1/2009 | Shimizu | |
| 2010/0112305 A1 | 5/2010 | Hong et al. | |
| 2012/0095182 A1 | 4/2012 | Wu et al. | |
| 2013/0323416 A1 | 12/2013 | Bertelo | |
| 2016/0024269 A1 | 1/2016 | Senoz et al. | |
| 2016/0184736 A1 | 6/2016 | Wyndham et al. | |
| 2018/0044484 A1 | 2/2018 | Kalyaraman | |
| 2019/0275735 A1* | 9/2019 | Lee | B29C 64/153 |
| 2020/0130265 A1* | 4/2020 | Magwood, Jr. | C08L 23/06 |
| 2020/0147261 A1 | 5/2020 | Morrissette | |
| 2020/0306830 A1 | 10/2020 | Veregin | |

FOREIGN PATENT DOCUMENTS

| | | |
|---|---|---|
| CN | 112876796 A | 6/2021 |
| JP | 2012-507600 | 10/2012 |
| JP | 2012525449 A | 10/2012 |
| WO | WO 2016/042492 | 3/2016 |

OTHER PUBLICATIONS

Heo, Joo Hyung, International Search Report, PCT/US2022/038973, Nov. 18, 2022.

Heo, Joo Hyung, Written Opinion, PCT/US2022/038973, Nov. 18, 2022.

Brink et al., Fine polymeric powders from poly(arylene ether ketone)s, Polymer, 1993, pp. 825-829, v. 34(4).

Babu et al., High performance polymer particles for composite matrices: poly(arylene ether ether sulfide)s, Polymer, 1994, pp. 4949-4955, v. 35.

Henry, R., "Impact of particle size on HPLC column performance," LOGC Supplements, 2014, pp. 12-19, v. 32(4).

Berthod, et al., "A solid-phase extraction approach for the identification of pharmaceutical-sludge adsorption mechanisms", J Pharm Anal, 2014, pp. 117-124, v. 4(2).

Henry, R., "Impact of particle size on HPLC column performance", LCGC Supplements, vol. 32, Issue 4, pp. 12-19. Apr. 2014.

First Chinese Office Action from corresponding Chinese Application No. 202280051762.7 dated Nov. 12, 2025.

International Search Report from corresponding PCT/US2022/038974 dated Nov. 23, 2022.

Written Opinion from corresponding PCT/US2022/038974 dated Nov. 23, 2022.

Written Opinion from corresponding PCT/US2022/038976 dated Nov. 29, 2022.

Chinese Office Action from corresponding Chinese Application No. 202280051762.7 dated Nov. 12, 2025.

International Search Report from corresponding PCT/US2022/038976 dated Nov. 29, 2022.

Written Opinion from corresponding PCT/US2022/038973 dated Nov. 18, 2022.

International Search Report from corresponding PCT/US2022/038973 dated Nov. 18, 2022.

Ewing, Z., "Synthesis and characterization of PEEK analogues utilizing 3, 5-and 2, 4-difluorobenzophenone," B.S. Northern Kentucky University, Master's Thesis, 2016, pp. i-x, 1-49.

English translation of the First Office Action for Chinese Application No. 202280051762.7 dated Nov. 7, 2025.

* cited by examiner

Exemplar PEEK frit "PF14"

Competitor A PEEK Frit

Competitor B PEEK Frit

PEEK (Annealed 250°C 6h) 5 mm (2.1 x 150 mm)

METHODS OF MAKING MONODISPERSE POPULATIONS OF POLYARYLKETONE OR POLYARYLTHIOETHERKETONE PARTICLES

CROSS-REFERENCE TO RELATED APPLICATIONS

This application claims the benefit of, and priority to, U.S. Provisional Patent Application No. 63/227,341, filed Jul. 30, 2021, the contents of which are incorporated herein by reference for all purposes.

STATEMENT OF FEDERAL FUNDING

Not applicable.

PARTIES TO JOINT RESEARCH AGREEMENT

Not applicable.

BACKGROUND OF THE INVENTION

Chromatography columns and frits are well known in the art. Typically, chromatography columns consist of tubing systems and fittings allowing introduction of a liquid solvent and a sample into a cylindrical metal tube, typically of stainless steel, with a flow path in which a solvent and sample are introduced at or near the first end of the cylinder, pass through a packing material of particles, usually of silica or polymer based particles, and exit out the second end of the cylinder. A frit is usually disposed at the second, exit end of the column to retain in the column the particles comprising the packing materials, and a frit may be disposed at the first end of the column to keep particles from the packing material from migrating into the tubing or fittings from which solvent, sample, or both are introduced into the column. As described in Bailey, U.S. Pat. No. 5,651,931 ("Bailey" or the "Bailey patent") liquid chromatography systems allow a liquid solvent carrying a sample to pass through a column containing a packing material of particles, which are typically held in place by frits at either end of the column. As the liquid solvent (sometimes referred to as the "mobile phase") carries the sample through the particles constituting the packing material, or media, components (solutes) in the sample migrate through the particles at different rates, causing the components to separate as they move through the column. As the sample exits the column, the components pass by a detector, such as a fluorescence detector, or is collected in successive aliquots which are provided to a detector. The detector or detectors can be used to determine the presence and, in some systems, the amount, of particular chemicals present in the original sample.

Many current frits are made of metal, such as stainless steel. Stainless steel and other metals in liquid chromatography systems, however, can interact with ions and other chemical moieties in biological samples. See, for example, Bailey patent, at col. 2, lines 43-57. Some frits are made of biocompatible materials, such as polyetheretherketone, or "PEEK." Unfortunately, current commercially available PEEK frits tend to have PEEK particles with a distribution of multiple sizes and shapes, resulting in some inconsistency in the gaps or pores distributed throughout the frits, which makes it hard to provide fits with consistent porosity. They also have low permeability for any given bubble point pressure (or effective pore size) and low fracture strength. Additionally, to our knowledge, there are no commercially available PEEK frits with bubble point pressures of about 5" Hg or higher, or with an effective pore size of 2.5 μm or smaller.

It would be desirable to have devices and methods for making devices that provide biocompatible frits that have controlled particle sizes, resulting in an ability to provide better control of porosity, provide higher permeability, and provide higher mechanical strength than are afforded by currently available frits, as well as to provide other porous devices, such as filters, membranes and monoliths with similar better controlled porosity. Moreover, it would be desirable to have biocompatible particles, or media, for LC and HPLC columns, solid phase extraction columns, or other separation devices, that fall closely within the bounds of a selected population size. Surprisingly, the present invention fulfills these and other needs.

BRIEF SUMMARY OF THE INVENTION

In a first group of embodiments, the invention provides porous devices comprising a substantially monodisperse population of substantially spherical particles of polyarylketone polymer, or a thioether-containing analog thereof, which polymer has a melting temperature, which particles are less than 0.5 μm to about over 5 μm in diameter, such as from about 1 to about 10 μm in diameter, wherein a majority of the particles in the population have been sintered or otherwise fused to other members of the population. In some embodiments, the particles are less than 1 μm in diameter. In some embodiments, the particles are less than 0.5 μm in diameter. In some embodiments, the particles are about 1 to about 9 μm. In some embodiments, the particles are about 2 to about 9 μm in diameter. In some embodiments, the particles are about 4 to about 8 μm in diameter. In some embodiments, the particles are about 5 to about 6 μm in diameter. In some embodiments, the polyarylketone polymer or a thioether-containing analog thereof is a polyaryletherketone. In some embodiments, the polyaryletherketone is poly ether ether ketone ("PEEK"). In some embodiments, the porous device is a membrane, monolith, frit, or filter. In some embodiments, the porous device is a frit. In some embodiments, the frit is a liquid chromatography frit, optionally, a high-performance liquid chromatography ("HPLC") frit. In some embodiments, the particles of said frit are of PEEK. In some embodiments, the frit has a bubble-point pressure of about 2 to about 100 inches of mercury. In some embodiments, the frit has a bubble-point pressure of about 7 to about 13 inches of mercury. In some embodiments, the frit has a fracture strength of >100 N crush force when measured radially on edge for a 1.55 mm thick×2.1 mm diameter sample. In some embodiments, the frit has a fracture strength of >40 N crush force when measured radially on edge for a 1.55 mm thick×2.1 mm diameter sample. In some embodiments, the frit has a fracture strength of >150 MPa when measured axially on a frit sample. In some embodiments, the frit has a fracture strength of >40 MPa when measured axially on a frit sample. In some embodiments, the sintering of the particles of the monodisperse population have been slowly heated to a selected temperature around the melting temperature of the particles, held at the selected temperature for a selected period of time, and then cooled to ambient temperature. In some embodiments, the selected period of time is about 1 hour to about 24 hours. In some embodiments, the heating (ramp-up) is at a rate of from about 0.5° C./min to about 100° C./min. In some embodiments, the ramp-up is at a rate of from about 0.5° C./min to about 25° C./min, such as from about 1° C./min to about 10° C./min. In some embodiments, the selected period of time is 3 hours to 9 hours. In some embodiments, the cooling is at a rate of from about 0.25° C./min to about 100° C./min. In some embodiments, the cooling is at a rate of from about 0.25° C./min to about 25° C./min, such as from about 0.5° C./min to about 10° C./min. In some embodiments, the cooling is at a rate slower than 0.5° C./min. In some embodiments, the cooling is by cooling the porous device in an insulated container. In some embodiments, the insulated container is a furnace or oven used to heat the porous device for the sintering. In some embodiments, the insulated container is a furnace.

In a further group of embodiments, the invention provides containers holding a monodisperse population of substantially spherical particles of polyarylketone polymer or thioether-containing analogue of the polymer, which particles are 1 to about 10 μm in diameter, wherein said particles have not been sintered or otherwise fused to one another. In some embodiments, the particles are about 2 to about 9 μm in diameter. In some embodiments, the particles are about 1 to about 5 μm in diameter. In some embodiments, the polyarylketone polymer or thioether-containing analogue of the polymer is a polyaryletherlketone polymer. In some embodiments, the polyarylketone polymer is poly ether ether ketone ("PEEK"). In some embodiments, the particles have been annealed. In some embodiments, the particles have been annealed at a temperature of about 200 to about 300° C. In some embodiments, the particles have been annealed at a temperature of about 230 to about 290° C. In some embodiments, the container is a high-performance liquid chromatography ("HPLC") column. In some embodiments, the container is a solid-phase extraction cartridge or a capillary column. In some embodiments, the container is a channel or a chamber of a microfluidic device.

In another group of embodiments, the invention provides methods of making of a monodisperse population of substantially spherical particles of polyarylketone polymer or thioether-containing analogue of the polymer, with a molecular weight (Mw) of 5,000-200,000 Daltons, of a selected diameter, the method comprising: (a) providing dihalo-substituted monomers of the polyarylketone polymer or thioether-containing analogue of the polyaryletherketone polymer, (b) reacting the dihalo-substituted monomers with a selected compound under conditions allowing formation of dihalide monomers in which the ketone of the arylketone or of the thioether-containing analogue is protected by an acid-labile group; (c) copolymerizing the ketone-protected dihalide monomers with (i) hydroquinone monomer, and (ii) a proportion of unprotected dihalo monomers to protected dihalide monomer, which proportion is from about 0% to about 50%, such as from about 0% to about 30%, under conditions causing formation of a co-polymer of the protected dihalide monomers and the unprotected dihalide-monomers, if any, of a selected Mw of about 5,000-200,000 Daltons; (d) in a container, adding a strong acid to a solution containing said co-polymer in a solvent, and at least some water, thereby forming a solution having the strong acid and the co-polymer in said container, thereby forming a cleavage reaction solution having a concentration of the strong acid, a concentration of the co-polymer, and a concentration of water, under conditions allowing slow cleavage of the acid-labile protecting group from the co-polymer and formation of substantially spherical particles of the polyarylketone polymer or of the thioether-analogue of the polymer, thereby creating a monodisperse population of substantially spherical particles of polyarylketone polymer or thioether-containing analogue of the polymer, with a molecular weight (Mw) of about 5,000-200,000 Daltons of the selected diameter. In some embodiments, the acid-labile protecting group on the ketone functionality or functionalities is an imine formed following reaction of the keto-functionality with aniline. In some embodiments, the acid-labile protecting group on the ketone functionality or functionalities renders the co-polymer produced more soluble in at least one organic solvent or mixture of the at least one organic solvent and water than the polyarylketone polymer or thioether-containing analogue of the polymer, in the same organic solvent or mixture of organic solvent and water. In some embodiments, the organic solvent is N-methy-2-pyrrolidone (NMP). In some embodiments, the mixture of said at least one organic solvent and water is NMP and water. In some embodiments, the mixture is NMP and water at 5:1 to 330:1 (v/v). In some embodiments, the mixture is NMP and water at 15-35:1 (v/v). In some embodiments, the mixture is NMP and water at 20-25:1 (v/v). In some embodiments, the mixture is NMP and water at 24.5±1:1 (v/v). In some embodiments, the acid-labile protecting group on the ketone functionality or functionalities is a ketal, thioketal or dithioketal formed, respectively, from a corresponding aliphatic diol, mercapto-alcohol or dithiol. In some embodiments, the conditions allowing slow cleavage of the acid-labile protecting group from the co-polymer include briefly mixing said strong acid and said solution of said co-polymer to distribute said strong acid homogeneously throughout said solution of said co-polymer. In some embodiments, the "briefly mixing" is mixing for about 3 minutes or less such as about one minute ±30 seconds. In some embodiments, the "briefly mixing" is by stirring, shaking, rolling, sonicating, or a combination or sequence of one or more of these. In some embodiments, the strong acid is hydrochloric acid, nitric acid, sulfuric acid, hydrobromic acid, hydroiodic acid, perchloric acid, trifluoroacetic acid, trichloroacetic acid, dichloroacetic acid, chlorobromoacetic acid, trifluoromethanesulfonic acid, methanesulfonic acid, benzenesulfonic acid, or p-toluenesulfonic (tosic) acid. In some embodiments, the strong acid is tosic acid. In some embodiments, the cleavage of the acid-labile protecting group is at a temperature of from about 5° C. to about 90° C., such as from about 50° C. to about 70° C. In some embodiments, the cleavage of the acid-labile protecting group is at a temperature of from about 60° C. In some embodiments, the polyarylketone polymer is a polyaryletherketone. In some embodiments, the polyaryletherketone polymer is poly ether ether ketone ("PEEK"). In some embodiments, the concentration of strong acid in said cleavage reaction solution is from about 0.2 to about 20 mmol/liter. In some embodiments, the concentration of the co-polymer in the cleavage reaction solution is less than 170 mmol equivalents of the polymer's repeat unit/liter. In some embodiments, the concentration of co-polymer in the cleavage reaction solution may be from about 5 to about 170 mmol equivalents of repeat unit/liter. In some embodiments, the concentration of co-polymer in the cleavage reaction solution is from about 10 to about 65 mmol equivalents of repeat unit/liter. In some embodiments, the concentration of co-polymer in said cleavage reaction solution is less than about 75 mmol equivalents of repeat unit/liter. In some embodiments, the concentration of co-polymer in said cleavage reaction solution is from about 15 to about 50 mmol equivalents of repeat unit/liter. In some embodiments, the concentration of co-polymer in said cleavage reaction solution is from about 18 to about 25 mmol equivalents of repeat unit/liter. In some embodiments, the concentration of co-polymer in said cleavage reaction solution is from about 20 to about 21 mmol equivalents of repeat unit/liter. In some embodiments, the concentration of water present in said cleavage reaction solution is from about an equimolar to about 100-fold excess to the moles of protecting groups on said copolymer available to be cleaved. In some embodiments, the solvent in the solution holding the co-polymer is N,N-dimethylacetamide, N,N-dimethylformamide, N-methy-2-pyrrolidone, tetrahydrofuran, 2-methyl-tetrahydrofuran, dichlorobenzene, chlorobenzene, chloroform, dichloromethane, N-butyl-2-pyrrolidone, N-ethyl-2-pyrrolidone, furfural, γ-butyrolactone & γ-valerolactone, 1,3-dimethyl-2-imidazolidinone, N,N'-dimethylpropyleneurea, or a mixture of one or more of these. In some embodiments, the copolymers have a molecular weight (Mw) of about 10,000 to about 75,000 Daltons. In some embodiments, the copolymers have a molecular weight (Mw) of about 26,000 to about 34,000 Daltons. In some embodiments, the dihalo-monomers have a purity of about 95% or higher.

In still another group of embodiments, the invention provides methods of manufacturing a porous device, the methods comprising (a) obtaining a substantially monodisperse population of substantially spherical particles of polyaryletherketone polymer or a thio-analogue of such a polymer in a container, (b) pressing the substantially monodisperse population of substantially spherical particles of said polyaryletherketonepolymer or said thio-analogue of the polymer, in the container with a force of from about 5 $N/mm^2$ to about 200 $N/mm^2$, such as from about 5 $N/mm^2$ to about 75 $N/mm^2$ and then (c) sintering or otherwise fusing the substantially monodisperse population of substantially spherical particles to one another, thereby manufacturing the porous device. In some embodiments, the porous device is a frit. In some embodiments, the porous device is a filter. In some embodiments, the substantially monodisperse population of substantially spherical particles of polyaryletherketone polymer or a thio-analogue of such a polymer are 10 μm or smaller in diameter. In some embodiments, the sintering in step (c) is at about 300° C. to about 360° C. In some embodiments, the sintering in step (c) is at about 330° C. to about 338° C. In some embodiments, the sintering in step (c) is at about 342° C. to about 360° C. In some embodiments, the sintering in step (c) is for about 1 to about 24 hours. In some embodiments, the sintering in step (c) is for about 3 to about 9 hours. In some embodiments, the heating is at a rate of from about 0.5° C./min to about 100° C./min. In some embodiments, the ramp-up is at a rate of from about 0.5° C./min to about 25° C./min, such as from about 1° C./min to about 10° C./min. In some embodiments, the cooling is at a rate of from about 0.25° C./min to about 100° C./min. In some embodiments, the cooling is at a rate of from about 0.25° C./min to about 25° C./min, such as from about 0.5° C./min to about 10° C./min. In some embodiments, the cooling is at a rate slower than 0.5° C./min.

In yet a further group of embodiments, the invention provides methods of separating analytes, such as biomolecules or small molecules in a column or cartridge, comprising (a) providing a column or cartridge packed with a substantially monodisperse population of substantially spherical particles of polyaryletherketone polymer or a thio-analogue of such a polymer, which particles are 10 μm or smaller in diameter, (b) introducing the biomolecules into the column or cartridge, and (c) running a mobile phase through the column or cartridge, thereby separating the biomolecules on the column or cartridge. In some embodiments, the substantially spherical particles of polyaryletherketone polymer are polyetheretherketone particles. In some embodiments, the biomolecules are oligonucleotides, proteins, glycoproteins, peptides, peptidoglycans, glycans, or a combination of one or more of these. In some embodiments, the glycoproteins are antibodies. In some embodiments, the antibodies are monoclonal antibodies. In some embodiments, the mobile phase is water, a salt solution, acid or acidic solution or acidic buffer, pH neutral solution or neutral buffer, base or basic solution or basic buffer, an organic solvent, supercritical carbon dioxide, or a combination of one or more of these. In some embodiments, the organic solvent is acetonitrile.

BRIEF DESCRIPTION OF THE DRAWINGS

FIGS. 1A-C set forth photographs of PEEK particles of an exemplar frit made of particles of polyaryletheretherketone ("PEEK") made by the inventive methods, and those of current commercially available PEEK frits. FIG. 1A: Photographs at 160× magnification of particles of exemplar PEEK frits manufactured by an embodiment of the inventive methods Inset: Photograph of particles from the same frit at 650× magnification. FIG. 1B: Photograph at 200× magnification of PEEK particles of a current commercially available frit. Size bar: 100 μm. FIG. 1C: Photograph at 230× magnification of PEEK particles of a second current commercially available frit. Size bar: 100 μm.

FIG. 2 is a graph showing the relationship between the percentage of monomer with protected carbonyl groups in the polymerization mixture and the particle size in μm of particles from the resulting polymerization after acid hydrolysis. Y axis: final particle size in microns of the modal peak as measured by the Coulter principle. X axis: proportion of monomers with protected carbonyl groups, in percent.

FIG. 3 is a graph showing the molecular weight of ketimine prepolymer formed over time by reacting recrystallized ketimine monomers with hydroquinone at 165° C. X axis: Time, in hours (h). Y axis: Molecular weight in Daltons of the ketimine prepolymer in samples taken at the time points indicated.

FIG. 4 is a photograph taken at 250× magnification of PEEK particles produced during the study reported in Example 2. Size bar: 100 μm.

FIG. 5A. FIG. 5A is a graph showing the size distribution of a population of exemplar PEEK particles made by the inventive methods to a size of 5 μm, when analyzed by the Coulter principle on a Beckman Coulter Multisizer 3 Coulter Counter. Y axis: number of particles at each size. X axis: Particle diameter, in μm. FIG. 5B. FIG. 5B is a graph showing the size distribution of a population of exemplar PEEK particles made by the inventive methods to a size 3 μm, when analyzed by the Coulter principle on a Beckman Coulter Multisizer 3 Coulter Counter. Y axis: number of particles at each size. X axis: Particle diameter, in μm.

FIG. 6 comprises of two overlaid chromatograms obtained from an Agilent 1290 Infinity HPLC system using UV diode array detection showing the separation of oligonucleotide ladder standards (darker trace) and oligonucleotide resolution standards (lighter trace) using a 2.1×150 mm column packed with solid, non-porous PEEK particles produced by the methods described herein (Table 6). The PEEK particles were 4.5 μm in size. The analytes were run at a temperature of 65° C. and analyzed by UV at 260 nm. The oligonucleotide resolution standards are seen as coming off the column at between 7 and 9.5 minutes, while the oligonucleotide ladder standards are seen coming off at between 12.5 and 16 minutes. X: time in minutes. Y axis:

absorbance in milli-absorbance units ("mAU"), as measured by UV diode array detector at 260 nm.

Figure 6:
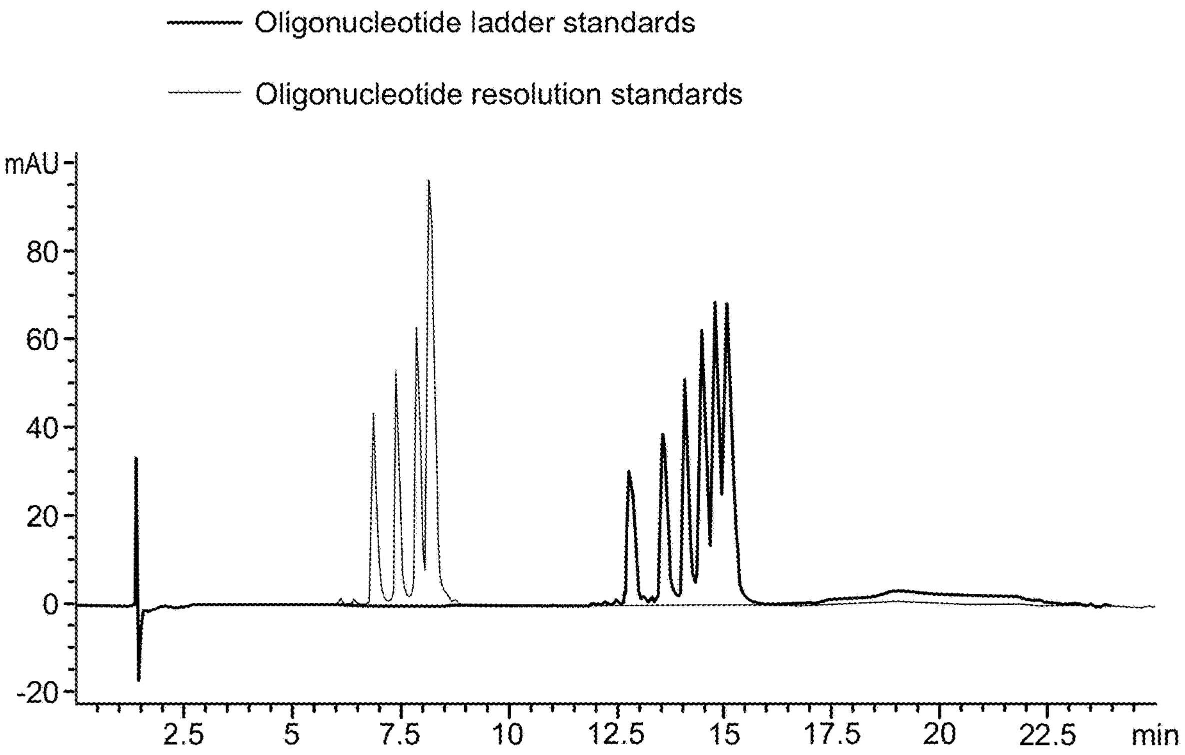
FIG. 6.
Figure 7:
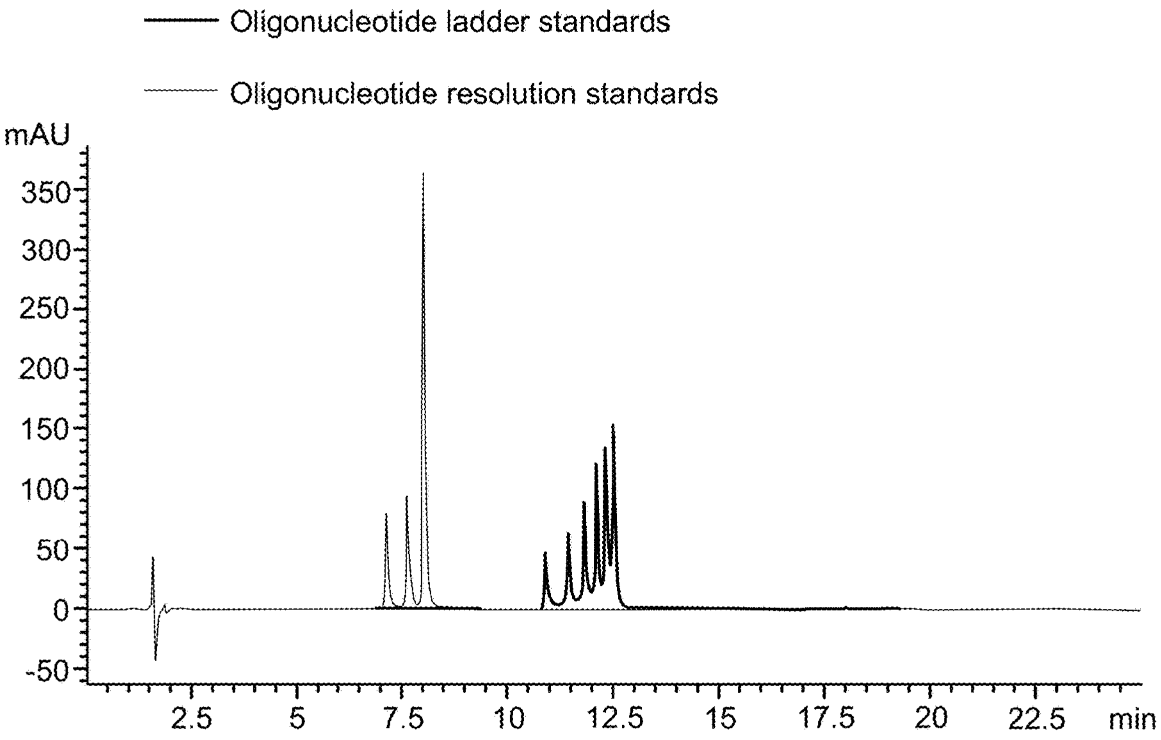

FIG. 7. FIG. 7 comprises of two overlaid chromatograms obtained from an Agilent 1290 Infinity HPLC system using UV diode array detection showing the separation of the same oligonucleotide ladder standards (darker trace) and oligonucleotide resolution standards (lighter trace) as used in FIG. 6, using an AdvanceBio Oligonucleotide 2.1×150 mm column (Agilent Technologies, Inc., Santa Clara, CA) packed with 2.7 μm superficially porous Poroshell particles (Agilent Technologies, Inc). The analytes were run at a temperature of 65° C. and detected by UV at 260 nm. The oligonucleotide resolution standards are seen coming off the column at between 6.5 and 8.5 minutes, while the oligonucleotide ladder standards are seen coming off at between 11 and 13 minutes. X axis: time in minutes. Y axis: Absorbance in mAU (at 260 nm).

Figure 8:
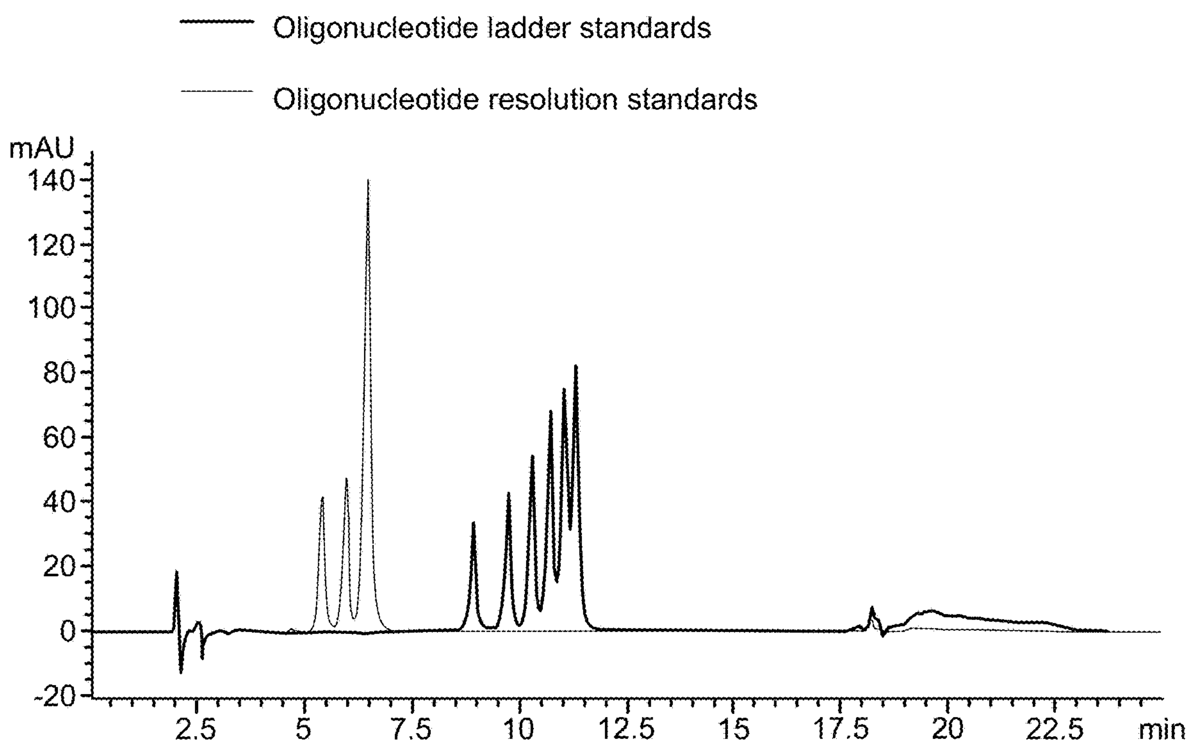

FIG. 8. FIG. 8 comprises of two overlaid chromatograms obtained from an Agilent 1290 Infinity HPLC system using UV diode array detection showing the separation of the same oligonucleotide ladder standards (darker trace) and oligonucleotide resolution standards (lighter trace) as used in FIG. 6, using a 2.1×50 mm column packed with PLRP-S 4000 Å 8 μm particles (Agilent Technologies, Inc.) The particles are fully porous polystyrene polymer particles with a pore size of 4000 Å. The analytes were run at a temperature of 65° C. and detected by UV at 260 nm. The oligonucleotide resolution standards are the ones shown on the graph as coming off the column at between 6.5 and 8.5 minutes, while the oligonucleotide ladder standards are seen coming off at between 11 and 13 minutes. X axis: time in minutes. Y axis: absorbance in mAU (at 260 nm).

Figure 9:
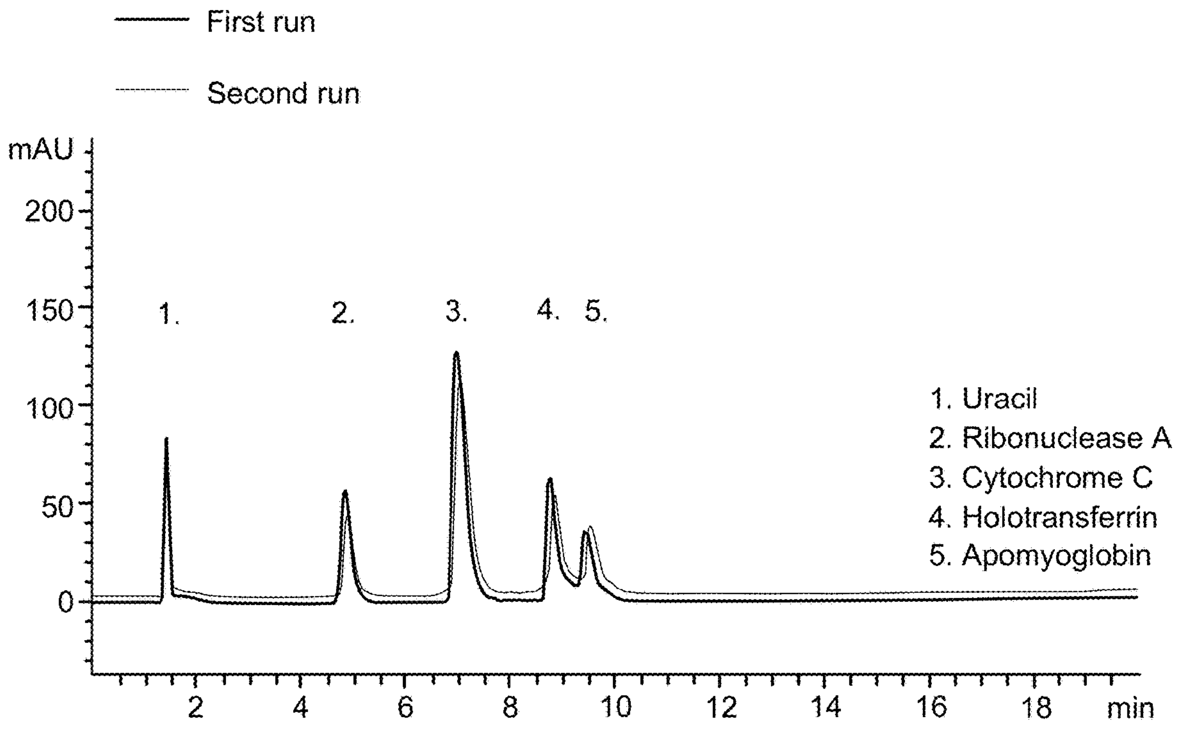

FIG. 9. FIG. 9 comprises of two overlaid (repeat run) chromatograms obtained from an Agilent 1290 Infinity HPLC system using UV diode array detection showing the resolution of a nucleobase, uracil (as an unretained analyte), and the proteins ribonuclease A, cytochrome C, holotransferrin, and apomyoglobin, on a 2.1×150 mm column packed with exemplar 5 μm particles made by the inventive methods, which had been annealed for 6 hours at 250° C. The analytes were run at a flow rate of 0.21 mL/min at a temperature of 30° C. and detected by UV at 280 nm. X axis: time in minutes. Y axis: absorbance in mAU (at 280 nm). Peaks are listed in the Figure in the order they eluted from the column.

Figure 10:
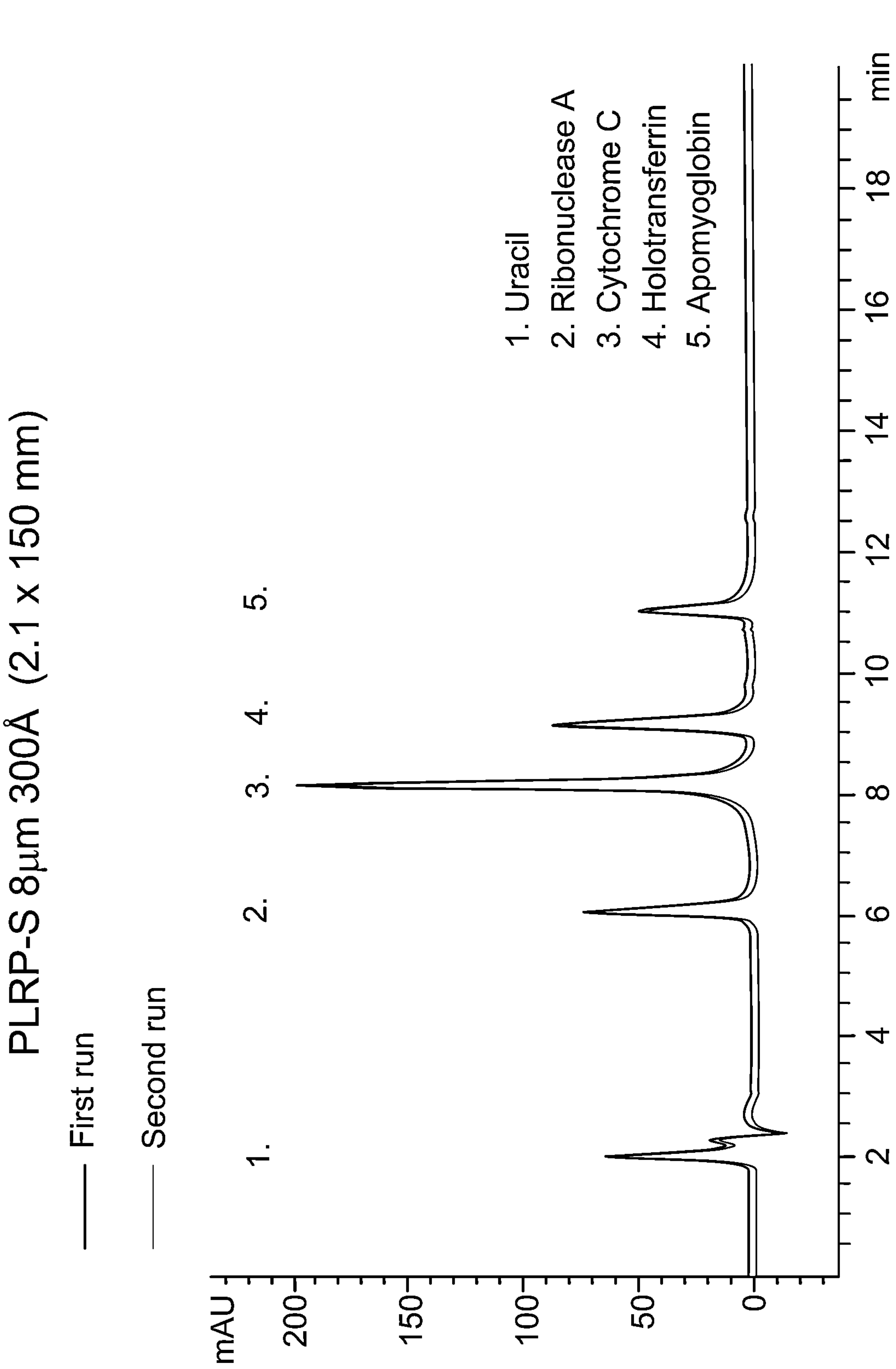

FIG. 10. FIG. 10 comprises of two overlaid (repeat run) chromatograms obtained from an Agilent 1290 Infinity HPLC system using UV diode array detection, showing the separation of the same proteins and nucleobase as used in FIG. 9, using a 2.1×150 mm column packed with PLRP-S 300 Å 8 μm particles (Agilent Technologies, Inc.) The particles are fully porous polymer particles with a pore size of 300 Å. The analytes were run at the same conditions shown in FIG. 9. X axis: time in minutes. Y axis: absorbance in mAU (at 280 nm). Peaks are listed in the Figure in the order they eluted from the column.

Figure 11:
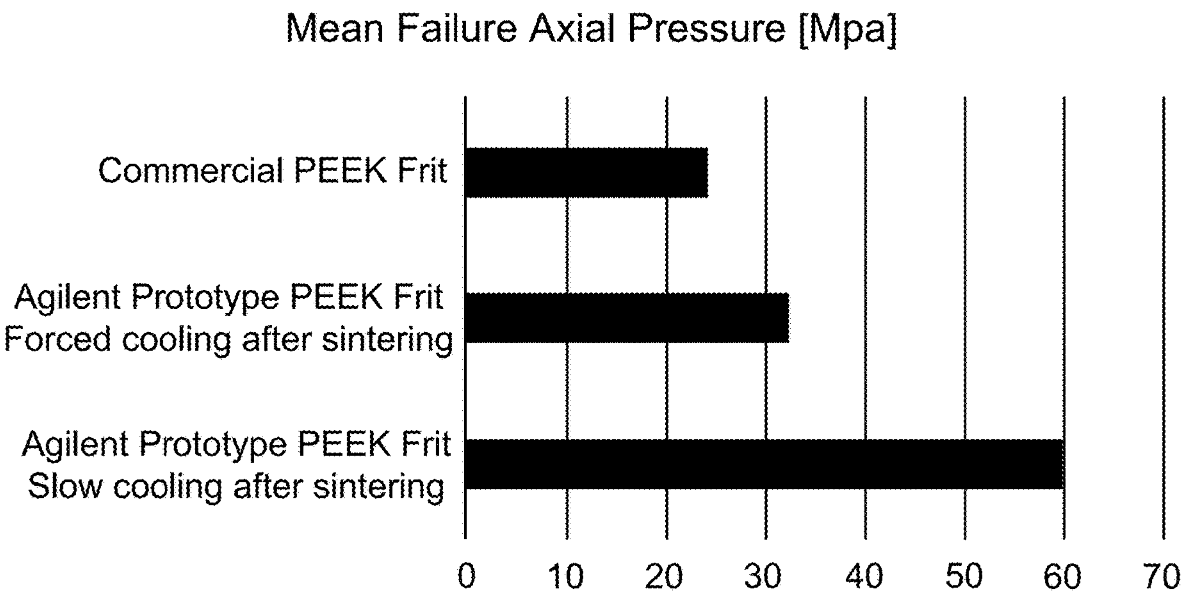

FIG. 11. FIG. 11 is a graph presenting the results of studies testing the ability of selected exemplar porous devices, frits, to withstand axial pressure. The frits tested were (1) a PEEK frit made by the inventive methods sintered at a cooling rate of 100° C./min, (2) a PEEK frit made by the inventive methods sintered at a cooling rate of 8° C./min, and (3) a PEEK frit made by the inventive methods sintered at a cooling rate of 0.3° C./min Y axis: Mean failure under axial pressure, in MPa.

Figure 12:
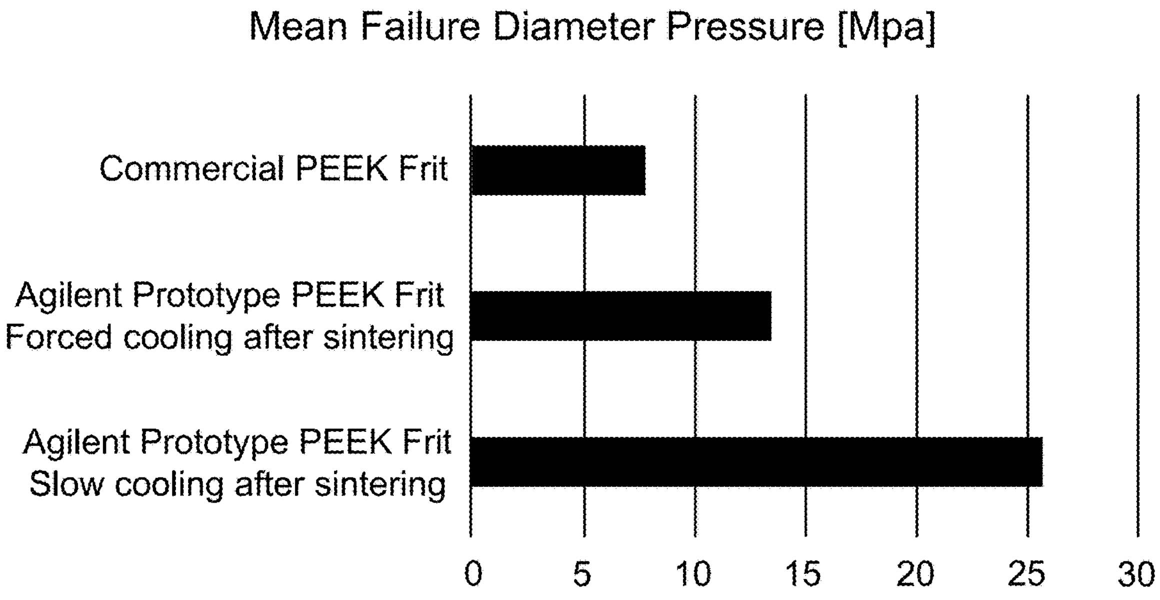

FIG. 12. FIG. 12 is a graph presenting the results of studies testing the ability of selected exemplar porous devices, frits, to withstand radial pressure. The frits tested were (1) a PEEK frit made by the inventive methods sintered at a cooling rate of 100° C./min, (2) a PEEK frit made by the inventive methods sintered at a cooling rate of 8° C./min, and (3) a PEEK frit made by the inventive methods sintered at a cooling rate of 0.3° C./min Y axis: Mean failure under radial pressure, in MPa.

Figure 13:
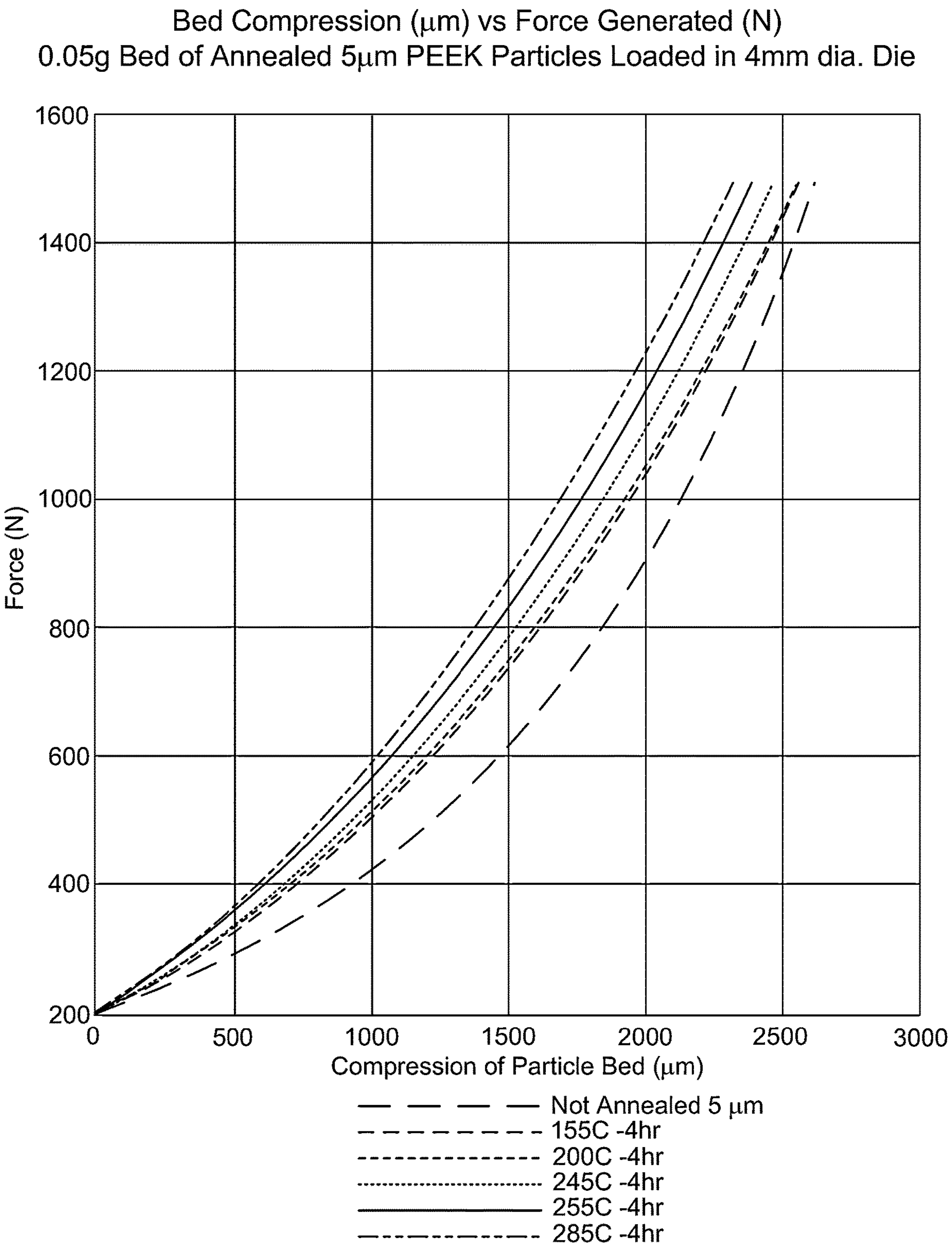

FIG. 13. FIG. 13 is a graph presenting the results of studies testing the compression under pressure of a bed of exemplar polyarylketone particles made by the inventive methods and either annealed or left unannealed before loading into a container. Exemplar 5 μm PEEK particles (0.05 g) were loaded into a 4 mm diameter die and then subjected to pressure. Y axis: Force, in N. X axis: compression of particle bed, in μm. Legend: Long dashes: unannealed particles. Short dashes, widely spaced: particles annealed at 155° C. for four hours. Short dashes, closely spaced: particles annealed at 200° C. for four hours. Dotted line: particles annealed at 245° C. for four hours. Solid line: particles annealed at 255° C. for four hours. Two dots and long dash in series: particles annealed at 285° C. for 4 hours.

Figure 14:
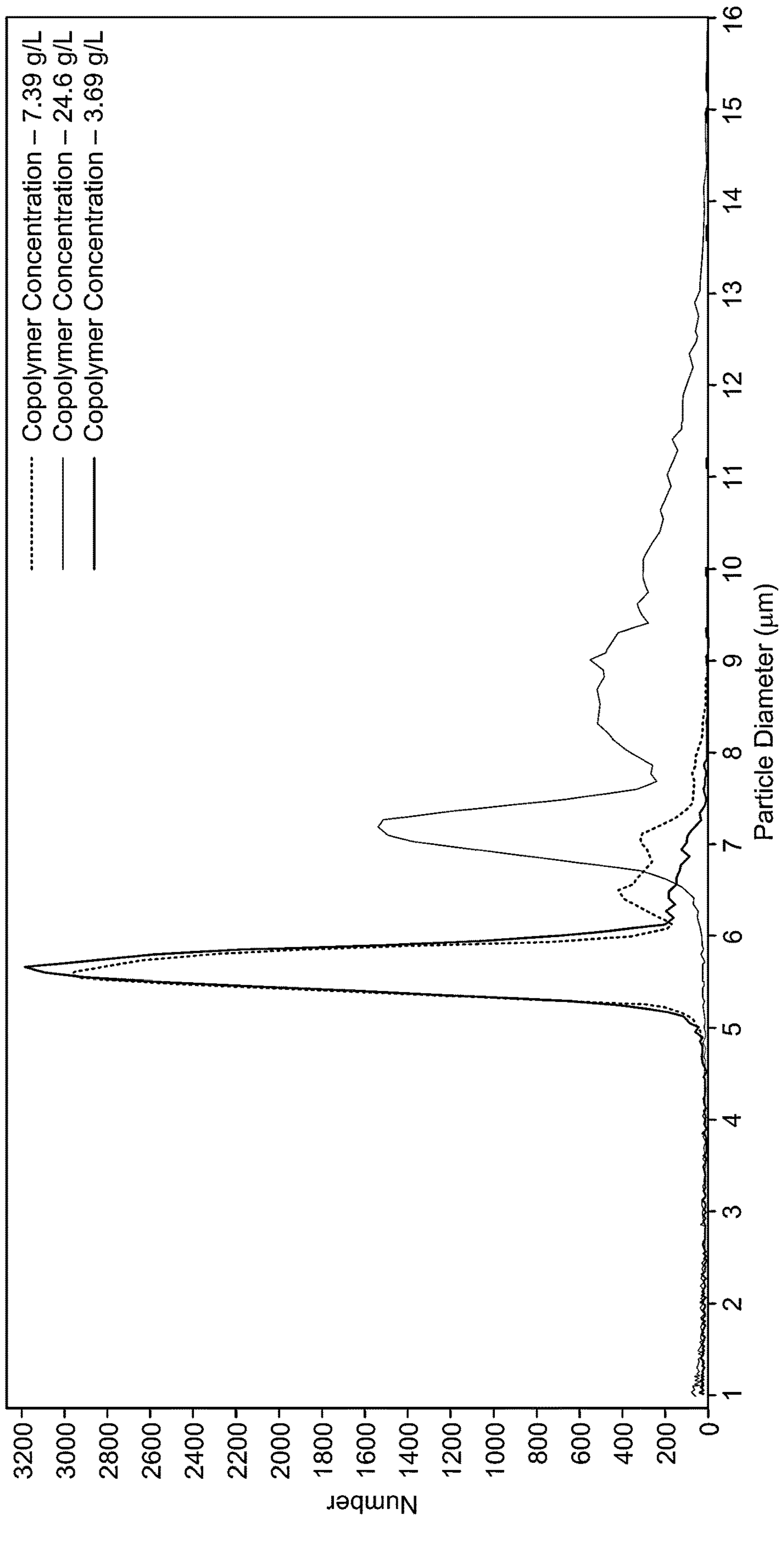

FIG. 14. FIG. 14 is a graph presenting the results of studies showing the size distribution of three populations of particles formed during the study described in Example 3 when analyzed by the Coulter principle on a Beckman Coulter Multisizer 3 Coulter Counter. Y axis: number of particles at each size. X axis: Particle diameter, in μm. The grey coulter trace shows the result for the highest concentration of polymer (24.6 g/L of reaction mixture). The dotted coulter trace shows the result for an intermediate polymer concentration (7.39 g/L of reaction mixture). The solid black trace shows the result for the lowest concentration of ketimine co-polymer (3.69 g/L of reaction mixture).

Figure 15:
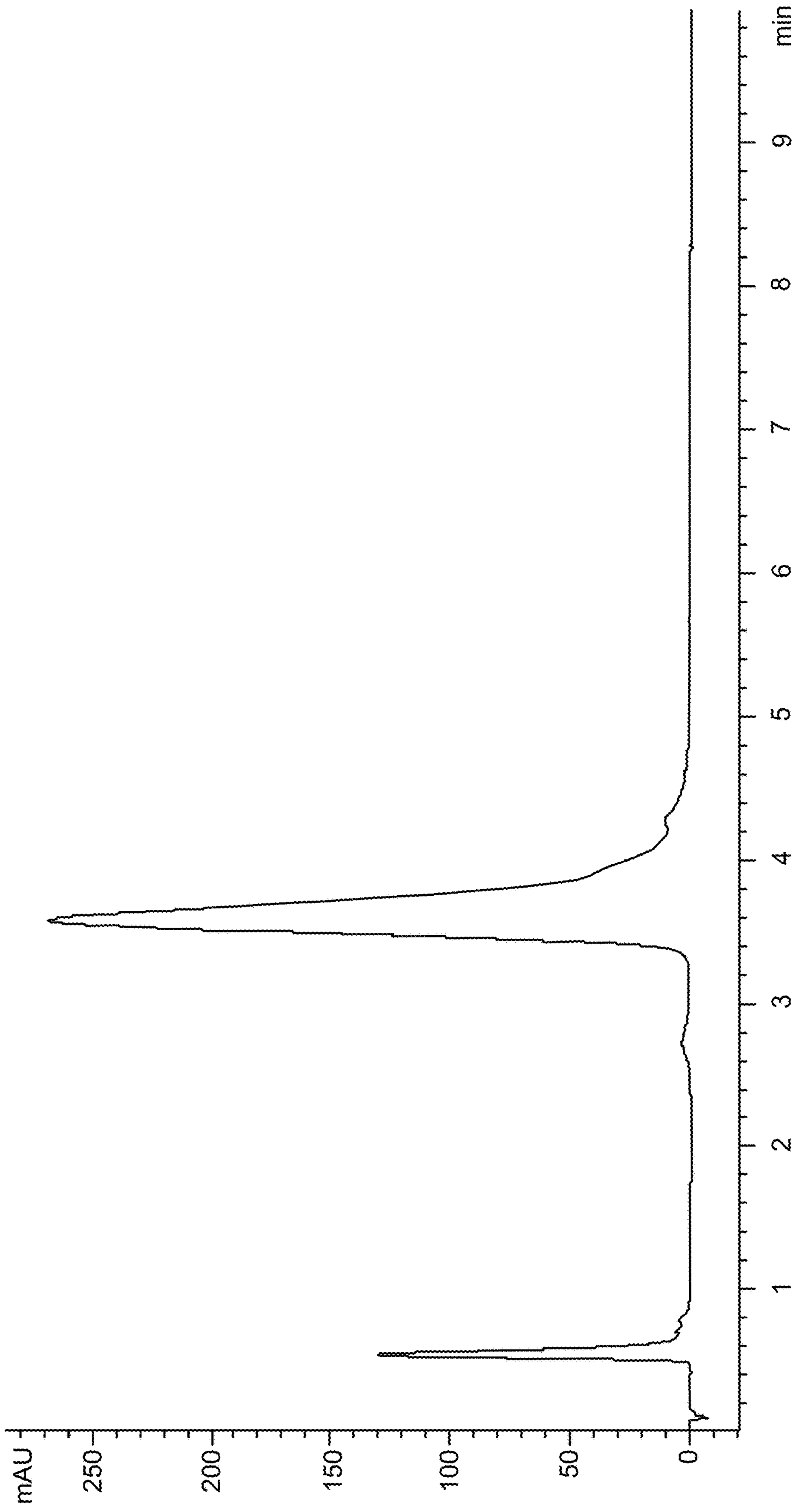

FIG. 15. FIG. 15 is a chromatogram for a ~1 mg/ml sample of an exemplar monoclonal antibody ("mAb"), ramucirumab, run at 80° C., with a flow rate of 2.1 ml/min, through a liquid chromatography column packed with PEEK 2.7 μm non-porous media. X axis: time, in minutes. Y axis: UV absorbance at 220 nm, in milli Absorbance units ("mAU").

Figure 16:
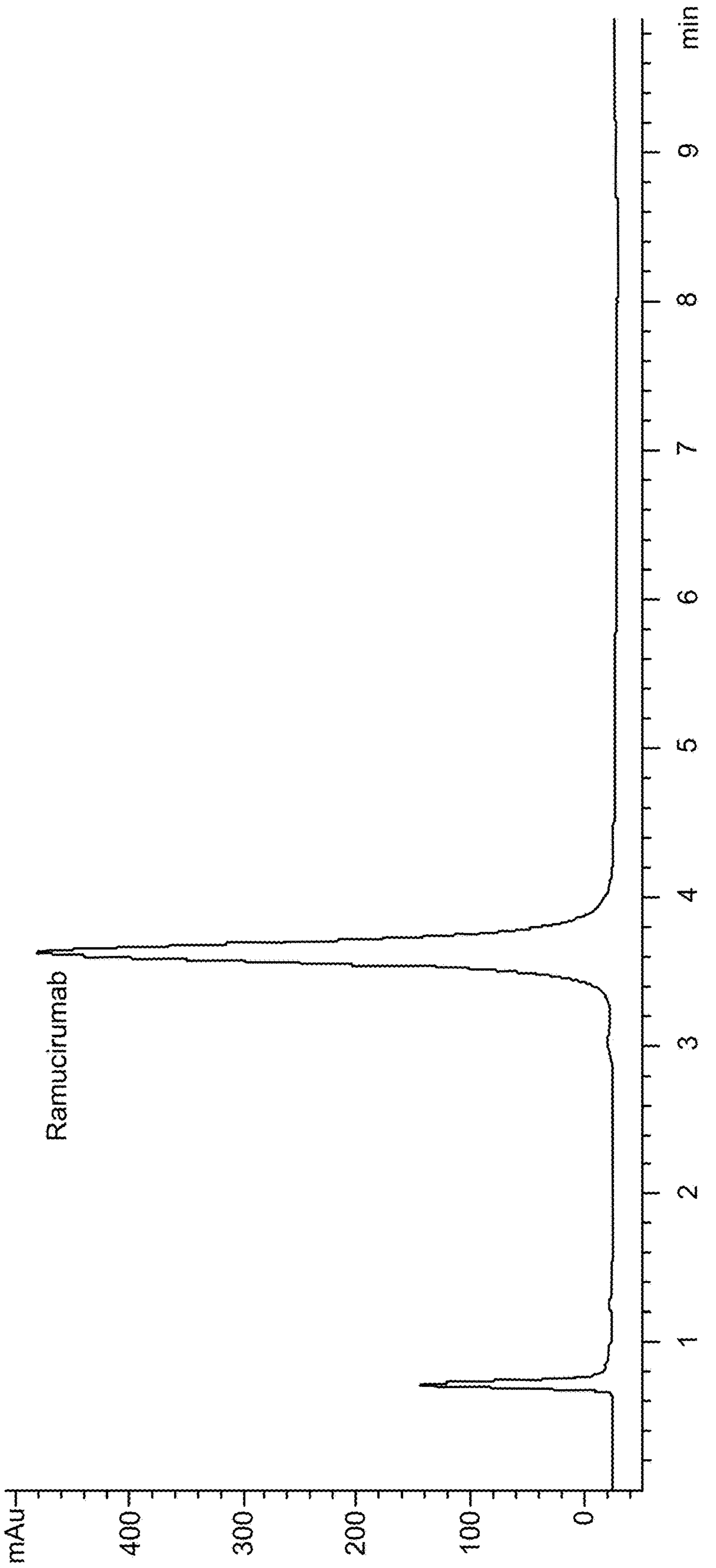

FIG. 16. FIG. 16 is a chromatogram for ~1 mg/ml sample of an exemplar mAb, ramucirumab, run at 80° C. with a flow rate of 0.21 ml/min through a liquid chromatography column packed with PLRP-S 5 μm porous 1000 Å styrenic media at 80° C. with a flow rate of 0.21 ml/min, with UV detection at 220 nm. X axis: time, in minutes. Y axis: UV absorbance at 220 nm, in mAu.

Figure 17:
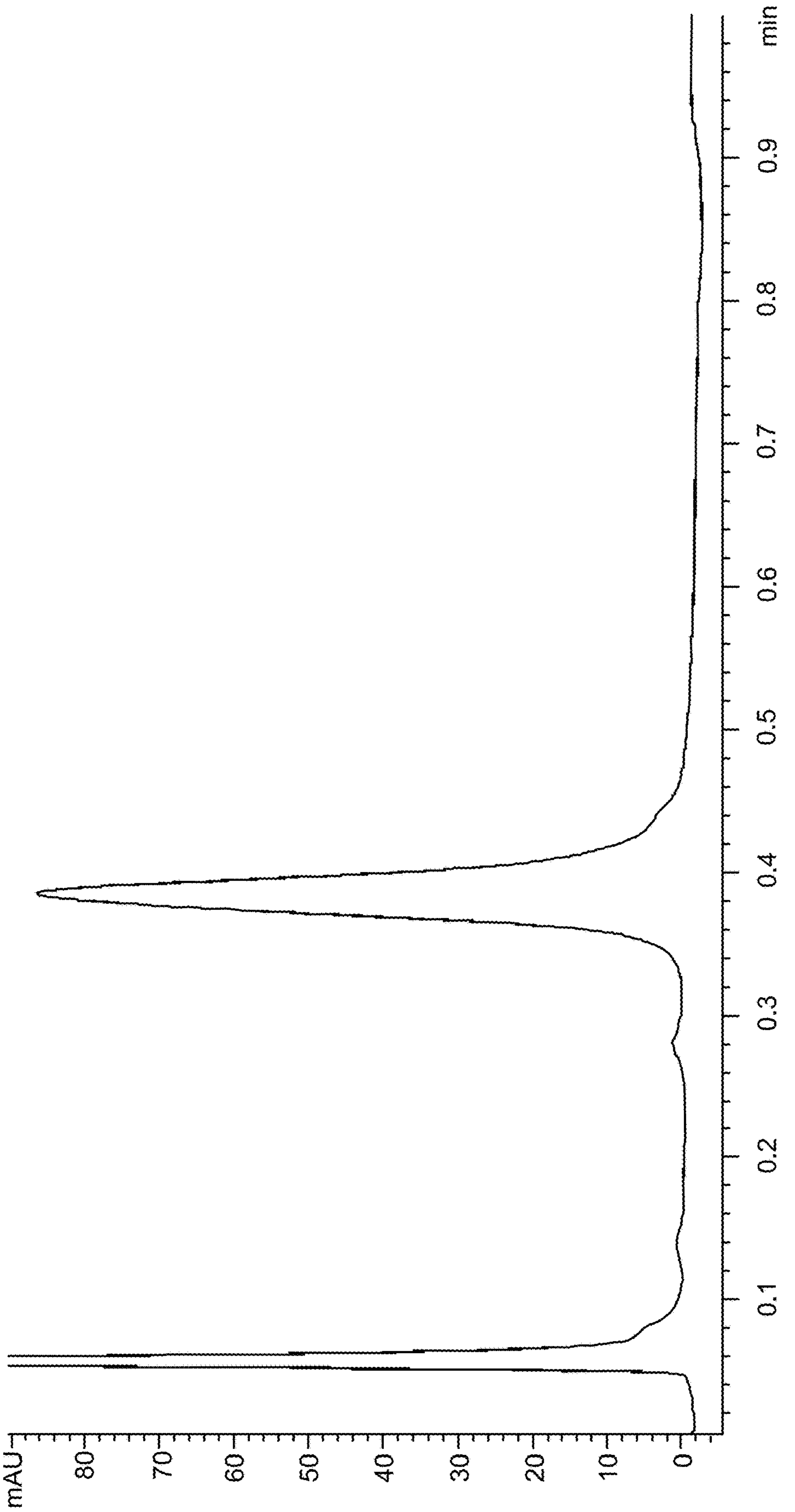

FIG. 17. FIG. 17 is a chromatogram of ~1 mg/ml sample of exemplar mAb, ramucirumab, run at 80° C. with a flow rate of 2.1 ml/min through a liquid chromatography column packed with PEEK solid media. The main peak for the ramucirumab sample is seen coming off the column at between 0.33 and 0.46 minutes. X axis: time, in minutes. Y axis: UV absorbance at 220 nm, in mAU.

Figure 18:
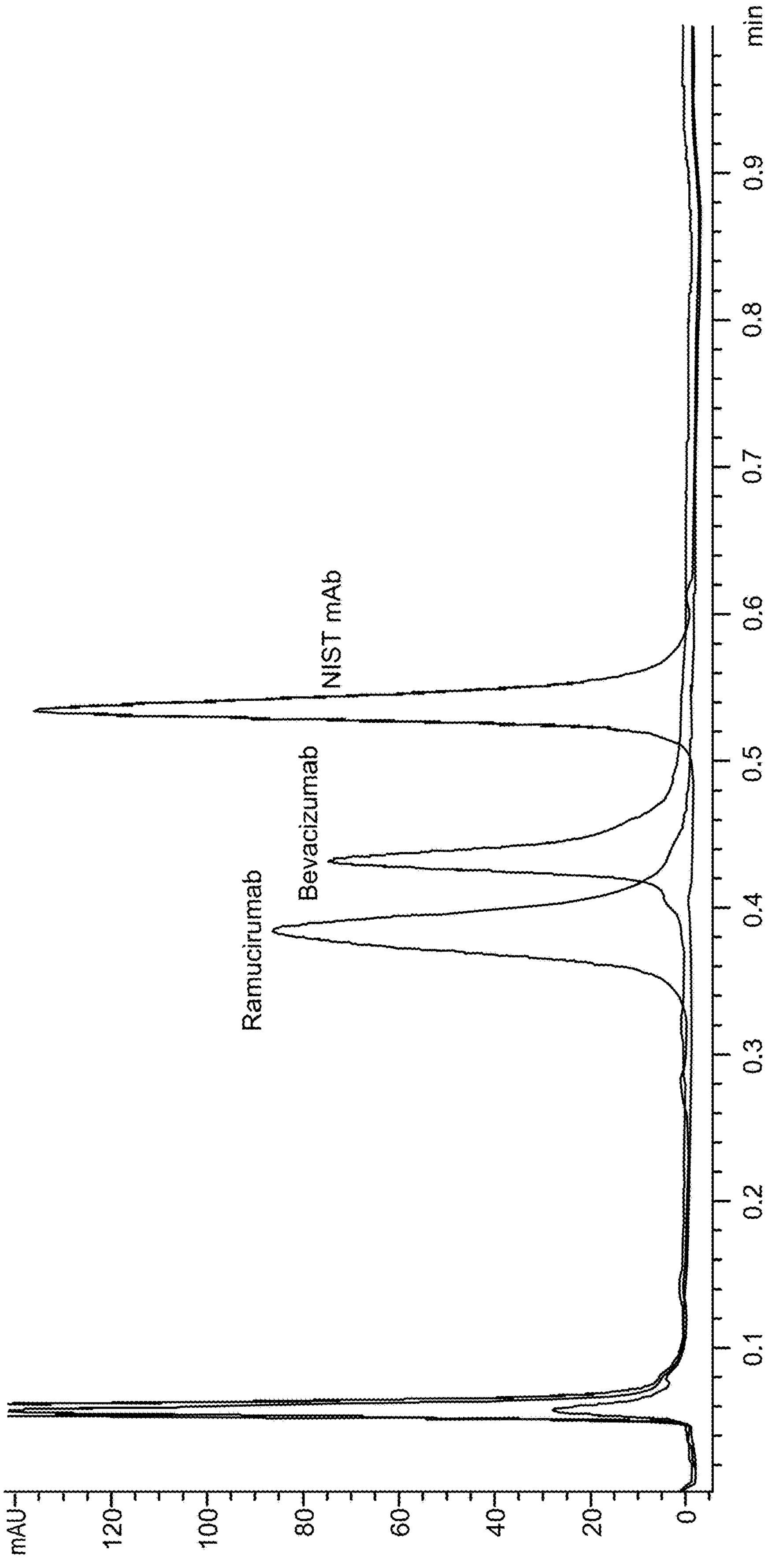

FIG. 18. FIG. 18 shows overlaid chromatograms for three exemplar monoclonal antibodies: ramucirumab, bevacizumab and NIST mAb, run under the same conditions as FIG. 17, demonstrating the capability of the PEEK media to successfully separate multiple different antibodies even under fast separation conditions. X axis: time, in minutes. Y axis: UV absorbance at 220 nm, in mAU.

Figure 19:
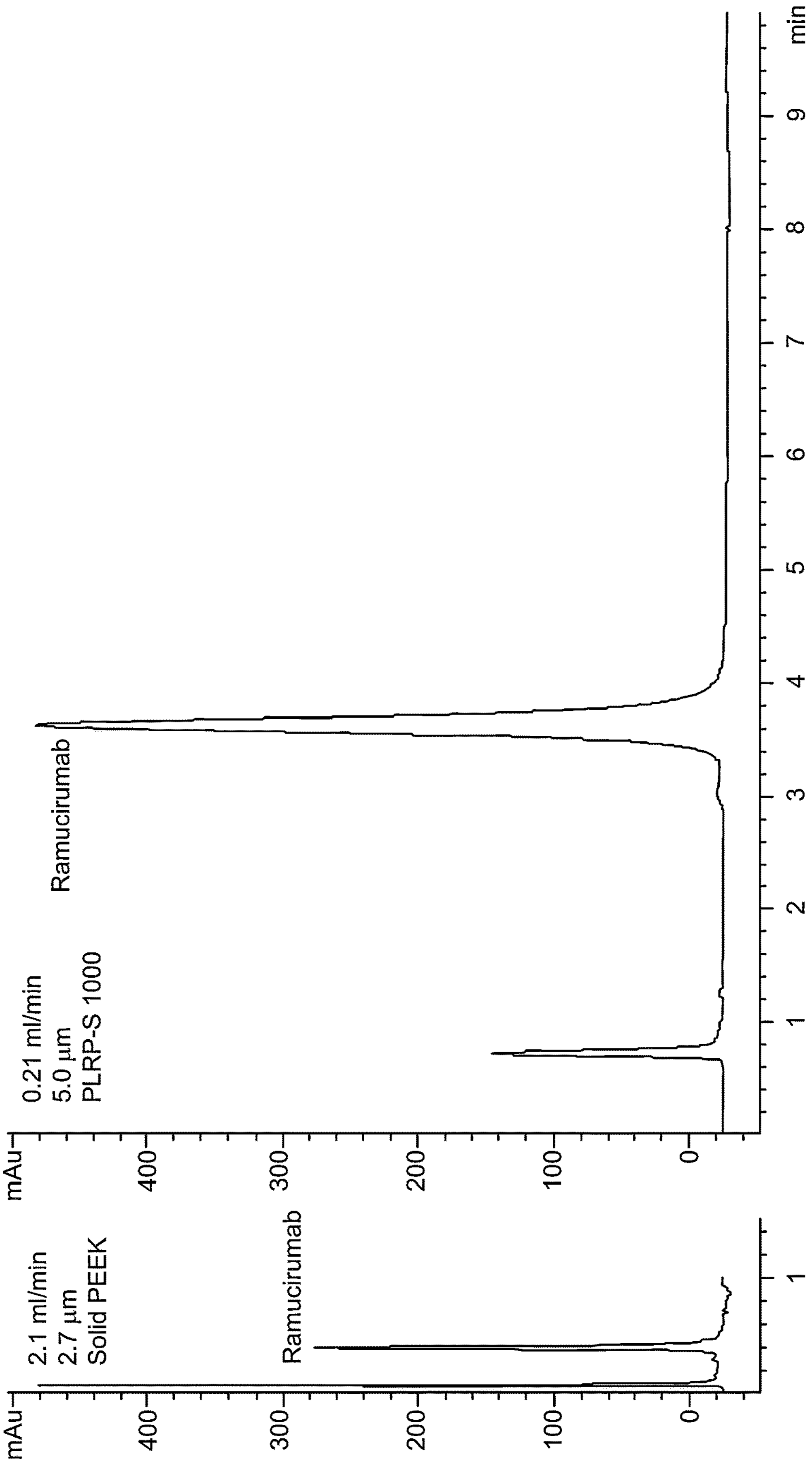

FIG. 19. FIG. 19 presents two chromatograms showing the result of running a sample containing an exemplar mAb, ramucirumab, through a liquid chromatography column packed with one of two different media. The left side shows the result of running the sample containing the antibody through a 2.1 mm diameter×50 mm length liquid chromatography column packed with 2.7 μm solid PEEK media at 2.1 ml/min. The right side shows the result of running a sample containing the same antibody through a liquid chromatography column of the same dimensions, but packed with 5 μm 1000 Å porous PLRP-S styrenic media, at a 0.21 ml/min flow rate. For both chromatograms, the X axis shows time, in minutes, while the Y axis shows the UV absorbance at 220 nm, in mAu.

DETAILED DESCRIPTION

Many frits currently used liquid chromatography ("LC"), and high-performance liquid chromatography ("HPLC") systems are made of metal. Such frits work well for the separation of organic and inorganic chemicals and many compounds in biological samples. Unfortunately, some ions, compounds, or other chemical moieties present in a biological sample can interact with metal frits, affecting the results of analyses of the samples in sometimes unpredictable ways. One way to address this problem is to make the frits out of materials that are considered to be biocompatible, that is, that do not interact with the chemical moieties present in biological samples under the conditions used during analyses. Polyarylketones constitute one group of biocompatible materials that have been used in frits. Polyaryletheretherketone, or "PEEK," frits, in particular, are commercially available from a number of suppliers. Suitable polyarylketones will be defined in more detail below, but as used herein, the term "polyarylketones" herein includes both polyaryletherketones and polyarylthioetherketones. Polyaryletheretherketone is an example of a polyaryletherketone. In general, any polyarylketone that has been used in manufacturing frits is expected to be suitable for use in making frits or other porous devices by the methods taught in this disclosure.

Current commercially available PEEK frits are formed from particles that have been made by being ground from larger pieces of PEEK. This results in particles that have a range of shapes and a wide range of sizes. In some instances, the particles are then subjected to a process referred to as "classifying" the particles, a term that includes a range of techniques, such as sieving and elutriation. By extensive processing, the range of sizes of the particles can be brought within a relatively narrow range, but the method is considered too expensive for use at scale. The classification process results in obtaining a collection of PEEK particles that can be very different in shape but that fall within the range of sizes determined by the user to be suitable for an intended purpose.

Once classified, the particles are then pressed firmly in a mold to form them into a "cake" in the shape of a frit of the desired shape and size. The particles are then heated, inside the mold or outside of it, to a point close to the melting point of the PEEK polymer.

Figure 1A:
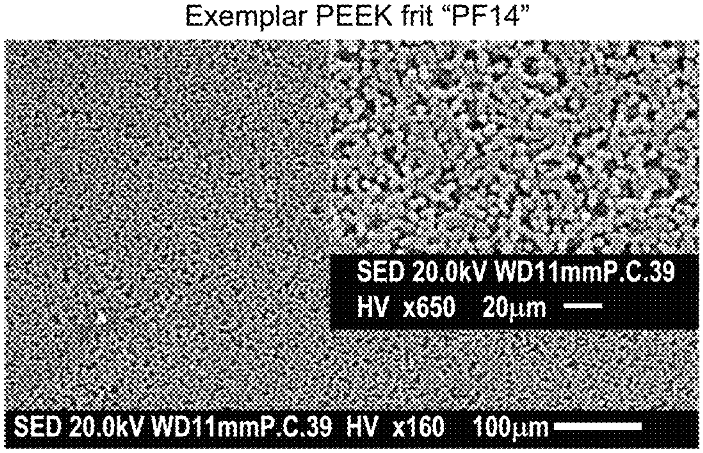
FIGS. 1A-C.
Figure 1B:
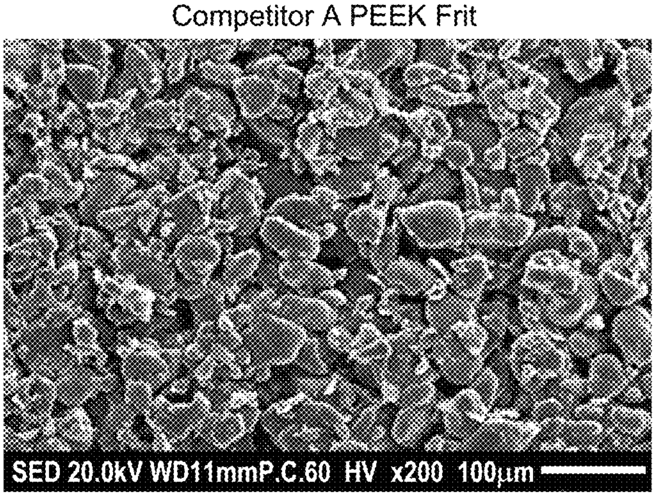

Even particles that have been carefully and extensively classified still vary widely in shape and size and do not readily fit together to provide gaps of consistent sizes between the particles. Referring to FIG. 1B as an example, it is believed that the particles shown were subjected to careful and extensive classification before being formed into a frit. The pore sizes of frits are dependent on, among other things, the size and the shape of the particles from which the frit is formed. Pressing together particles that have such a variety of shapes results in irregular gaps between the particles. The gaps vary unpredictability in size even among frits formed from particles of similar size, as the size and shape of the gaps depend on the shapes of each individual combination of particles being pressed together. As ground PEEK particles are not ductile and are of a variety of sizes and shapes that do not fit together well, high pressure needs to be used to compress the particles together in the mold to form the cake before the particles are heated. While the compression forces the particles together, squeezing irregularly shaped particles together does not result in frits with consistent porosity across the frit. This restricts pathways through the frits and thus flow through them, leading to lower permeability, higher back pressures, and increased potential to clog.

Thus, while frits made from particles of PEEK that have been ground from larger blocks have been used for years, the utility of such frits has been limited by variations in the size and shape of even classified ground PEEK particles, on the one hand, and the cost and extra handling steps of classifying the ground PEEK particles to try to obtain particles of a selected size distribution on the other. For clarity, it is noted that the brochures for some currently commercially available frits state that their PEEK frits have sizes such as 0.5, 2, 5, or 10 microns (or Grade 0.5, 2, 5, or 10 microns). It is believed that the sizes stated in the product literature of current frits relate to the nominal pore size, rather than the size of the particles comprising the frits or the effective pore size (defined as the diameter of the largest virtual circle that can be encompassed by the porous region) that is measured by either near 100% efficiency of removal of particles above the specified size from a gas/liquid flow, or indirectly derived from bubble point measurements. For example, a commercial PEEK frit of Grade 0.5 μm typically has bubble point pressure of about 2.5" Hg and an effective pore size of about 5 μm.

McGrath, U.S. Pat. No. 5,357,040 (hereafter referred to variously as "McGrath," the "McGrath patent" or the "'040 patent") appeared to provide a solution to these problems. McGrath, a patent that issued over a quarter century ago, states in its Abstract that fine particles of PEEK can be made by hydrolyzing PEEK from an amorphous polyarylketimine intermediate and that the choice of acid and its concentration affects the subsequent particle formation. The McGrath abstract further states that "zero or reduced amounts of agitation has been found to promote the formation of smaller (submicron) sized particles which are spherical in shape, while greater amounts of agitation or shear stress applied during hydrolysis results in non-spherical, larger particles."

Unfortunately, attempts to use the methods taught by McGrath to obtain a population of PEEK particles suitable for making frits or other porous devices useful in chromatography or microfluidic applications were not successful. First, attempts to reproduce the methods of McGrath as described in the section entitled 'Cleavage of the Ketimine Containing Polymers,' were unsuccessful. This section describes dissolving 25 g of polymer in 125 ml NMP. When McGrath's protocol was followed, the polymer would not dissolve. By reducing the concentration, however, the present inventors were successful in dissolving 10 g of polymer in 110 ml of NMP.

Second, McGrath states: "If the hydrolysis is conducted with little or no stirring, the particles are spherical and can be made as small as 0.5 μm in diameter. With agitation, the size of the particles can increase to the size of 5 μm." McGrath, col. 7, lines 50-56. Notably, McGrath does not show the size distribution of the particles produced or any images of the particles. Studies by the present inventors following the teachings of McGrath, however, resulted in production of populations of particles that were not consistent and with an irregular distribution in size. They found that they could improve the distribution and sphericity of the particles by not stirring, but obtained particles that were 0.8 μm to 1 μm in diameter, non-spherical, and still highly aggregated, with aggregates up to 50 μm in size. With stirring, the aggregation and particle size distribution became significantly worse.

The variation in size in particles produced by the McGrath method presumably was suitable for the application for which McGrath developed its PEEK particles: externally coating carbon fiber, in a process known as prepregging. They present, however, multiple problems for use in porous devices, such as frits.

First, to achieve devices that produce reproducible results, it is desirable for the frits, membranes, monoliths, or other porous devices to be manufactured from particles with a substantially monodisperse population size. Similarly, to provide consistent results from chromatographic columns, solid-phase extraction devices, or other separation devices, it is desirable that the particles forming the packing media be of a consistent, substantially monodisperse population size. While "substantially monodisperse population size" will be defined with more rigor below, it can be understood to mean a population of particles approximately the same size.

Second, even when efforts were made to use the McGrath teachings to achieve a population of particles of a particular size, for example, 5 μm, the particles produced also included many sub-micron particles, which for purposes of this disclosure are considered "fines." Fines were presumably not problematic for use of the particles to externally coat, or "prepreg," carbon fibers, which is the use for which the McGrath inventors developed their process, but they are quite problematic for use in porous devices, such as frits, membranes, and monoliths. As the fines move, they change the flow characteristics and back pressure of the porous device in unpredictable ways, as they block some gaps and open others and then move again and block or open gaps again. The fines also release unpredictably from the porous devices as the fines work their way through the pores and gaps in the devices that make them porous. This creates a significant concern in applications involving downstream tubing, such as in chromatographic systems, involving microfluidic channels, or involving instrumentation, as the fines can foul or contaminate the downstream tubing, microfluidic channels, or instrumentation. Moreover, the fines can lead to contamination of the sample being analyzed. Perhaps the fines resulting from the McGrath protocols are why, even after more than a quarter century, the methods described in the McGrath patent have not been adopted for producing fits made with particles of PEEK or other polyaryletherketone particles, and why commercially available frits appear to still be made by instead grinding particles from larger pieces.

Not surprisingly, since McGrath did not recognize the particle size distribution and fines produced by its method as a problem, it does not provide solutions for them, or for the other problems with trying to follow its methods for producing particles discussed in the succeeding sections.

Surprisingly, the present invention solves problems not solved by McGrath and allows, for the first time, controlled production of a substantially monodisperse population of substantially spherical particles of polyarylketones, such as PEEK. The substantially monodisperse population of substantially spherical particles are suitable for use in frits, membranes, monoliths, and other porous devices that need to be manufactured with reproducible characteristics and at reasonable cost.

Further surprisingly, the invention further allows the production of such populations without also producing fines (for purposes of this disclosure, fines are defined as particles having a defined percentage variation diameter from the main particle size. In some embodiments, fines are defined as having a diameter that is 50% smaller than the main particle size. In some embodiments, fines are defined as having a diameter that is 30% smaller than the main particle size). For clarity, it is noted that smaller particles could be produced if they were desired by adjusting the ratio of protected to unprotected monomer in the polymerization reaction, as discussed below. The inventive methods produce particles with a distribution that when graphed has a distinctive main peak at a given particle size (which size can be adjusted by the practitioner as described in more detail below), with a modest tail from the base of the main peak due to dimers (i.e., particles in the main peak size fused or aggregated together and counted as a single particle), but few if any particles with a size smaller than that of the particles of the main peak.

The absence of fines produced by the inventive methods is advantageous, as it allows the artisan to produce a substantially monodisperse population of particles with few if any fines and that therefore require only minimal handling and washing, as opposed to the extensive sizing and classification steps that would be necessary to remove fines (without necessarily achieving success) from a population of particles made following the teachings of McGrath. Further, while McGrath did not provide data on the size distribution of the particles produced by its method, it is believed the method would produce both fines and larger particles with a broad distribution of sizes. According to the information McGrath provided, the concentration of polymer repeat unit was 530 mmol. The work reported herein, however, indicates that that concentration would produce many numerous and fused particles, giving a very wide size distribution. Further, the high concentration of acid used by McGrath was result in very fast particle growth, again resulting in a broad particle size distribution. Accordingly, a population of particles made using the McGrath method would require exhaustive sieving and classification to try to achieve a substantially monodisperse population of particles of a desired size, without any guarantee of obtaining enough particles of the desired size to make a porous device from them, let alone enough to be able to make such devices in numbers and at a cost that would support their commercial sale and use. A typical frit with a size of 2.1 mm×1 mm made from 5 μm particles utilizes some 100-250 million particles, and that a typical HPLC column, with an inner diameter of 2.1 mm and a length of 150 mm, packed with 3 μm particles, contains some 5-10 billion particles. It is believed that no one has used the McGrath method to make substantially monodisperse population of polyaryletherketone particles of a desired size suitable for use in such devices during the quarter century since the McGrath patent issued. It is further believed that, given the practical constraints noted above, no one would.

Thus, the methods of the present invention allow for the first time the production in quantity of populations of polyarylketone particles within a tight size distribution, but which do not at the same time contain fines in numbers or percentages that would impair use of the population of particles in porous devices or for packing a container, such as a HPCL column, whose utility rests at least in part on having consistent flow characteristics. In some embodiments, the term "population of particles" as used herein means a population with a minimum of about 1,000,000, such as a minimum of about 10,000,000 particles. In some embodiments, the term "population of particles" as used herein means a population with a minimum of about 25,000,000 particles. In some embodiments, the term "population of particles" as used herein means a population with a minimum of about 50,000,000 particles. In some embodiments, the term "population of particles" as used herein means a population with a minimum of about 75,000,000 particles. In some embodiments, the term "population of particles" as used herein means a population with a minimum of about 100,000,000 particles ±10,000,000 particles. As used herein, unless specifically defined otherwise, the term "about" with respect to a stated value means 20% above or below the stated value.

The substantially monodisperse population of substantially spherical polyarylketone particles afforded by the present invention result in frits, membranes, monoliths, and other porous devices that can be produced with more controlled porosity, smaller pore sizes, and higher permeability than are fits made from particles produced by grinding. For example, PEEK frits made by the inventive methods provide better filtration capability, as evidenced by their having higher $N_2$ flow under the specified pressure during bubble point measurement, a common measure of permeability, than do current commercially available PEEK frits, which are presumably made of ground particles. Further surprisingly, when the inventive particles are annealed, they are less compressible when used as a bed in a container, and thus are more resistant to pressure than are unannealed particles. In some examples, the particles may be cooled slowly after being annealed.

In some embodiments, the inventive methods are particularly useful in providing substantially monodisperse population of particles for devices in which the desired size of the particles is about 10 μm or less, such as about 9 μm, about 8 μm, about 7 μm, about 6 μm, about 5 μm, about 4 μm, about 3 μm, about 2 μm, about 1 μm, below 1 μm, with "about" in the preceding recitations meaning ±50% of the specified particle size.

In another surprising finding, exemplar fits made by the inventive methods were much stronger than those made from particles produced by grinding, even though both are made of particles of the same material. Without wishing to be bound by theory, it is believed that this surprisingly greater strength is due to a combination of adaptations and changes from methods previously used in the art, and that the greater strength seen with respect to frits will also be seen with respect to other porous devices made by the inventive methods, such as membranes and monoliths. Some of the improvements relate to features of the particles made possible by the inventive methods, as further described below.

Figure 1C:
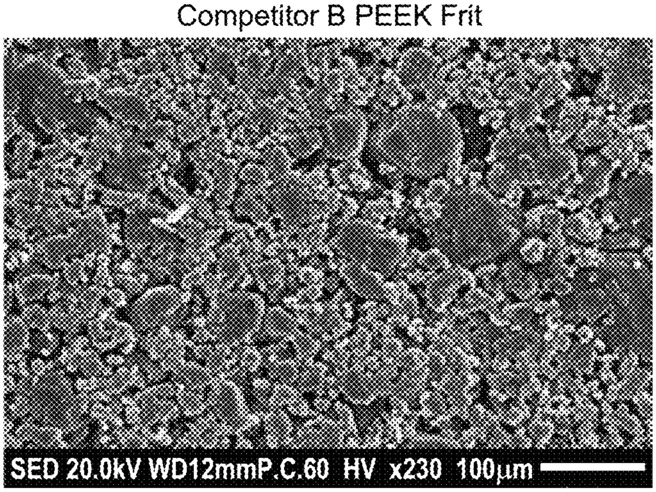

First, as the methods produce substantially spherical particles of a substantially monodisperse size, the gaps between the particles are more consistent in size than are particles made by grinding. FIG. 1A presents photographs of a frit made of PEEK particles produced by the inventive methods (the frit labeled "Exemplar PEEK Frit PF14") and two commercially available frits, as shown in FIGS. 1B and 1C, made by conventional methods (the frits labeled "Competitor A PEEK Frit" and "Competitor B PEEK Frit"). The difference in particle shape and size distribution is striking.

Second, the particles produced by the conventional method of grinding are usually much larger than the effective pore size desired and have fines and irregular shapes. To make frits of desirable pore size, very high pressure is required to compress the particles in order to form small gaps and obtain reasonable mechanical strength. For example, in the Bailey patent, 200 MPa pressure was used to compress 90 μm ground particles to form Grade 0.5 frits. But frit permeability is sacrificed as a result. On the other hand, PEEK particles made by the inventive methods are not only much smaller, spherical and uniform in size, but also more malleable than those made by grinding from a larger block of material. They can thus be shaped into the shape of the desired porous device, such as a frit, by pressing them together with a lower pressure (in some examples 10 to 30 MPa) than that needed for ground particles. Referring again to FIG. 1, one can see that the frit formed of PEEK particles made by the inventive methods (the "Prototype PEEK Frit PF14") is formed of particles that retain a largely spherical shape, while the particles forming the competitor frits (FIGS. 1B and 1C) are not only of different sizes and shapes, but also appear to be "squashed together" to reduce the gaps caused by those differences in sizes and shapes.

Third, in some embodiments of the inventive methods, the particles are sintered or otherwise subjected to heat to bond them together to form the porous devices. Studies underlying the present disclosure revealed that changing the rate of cooling used in previous methods taught in the art to allow the frits to cool over a much longer period results in a stronger device. HPLC fits made by these embodiments of the inventive methods can withstand substantially higher column packing and operating pressures than current commercially available PEEK frits of the same size/format. For discrete particles, it was discovered that raising the temperature to above the glass transition temperature but still below the temperature at which the particles fuse to one another, and then maintaining at that temperature for a period, followed by slow cooling, allows the PEEK within the particles to melt and recrystallize to improve the particle's crystalline structure resulting, it is believed, in more robust individual PEEK particles.

Fourth, as noted above, the substantially monodisperse population of particles has few, if any, fines and therefore provides more consistent flow characteristics than can be achieved by following the teachings of McGrath.

Taken together, this combination of changes to previous methods of producing porous devices provides porous devices, such as frits, membranes and monoliths, with a combination of properties that are surprisingly advantageous and that are not believed to be achievable by previous techniques or, if achievable, could not be achieved without arduous additional handling, sizing, and washing steps. Further, the inventive methods allow the production of separation media, such as the packing material for chromatographic columns and solid-phase extraction cartridges, with substantially monodisperse populations at sizes that have previously been unavailable or, if achievable, could not be achieved without arduous additional handling, sizing, and washing steps. In particular, the methods allow production of populations of particles that are not only substantially spherical, with particle sizes that are substantially monodisperse, but also substantially free of fines.

The sections below explain aspects of the inventive methods and compositions in more detail.

Substantially Monodisperse Populations of Particles

It is understood that the particles formed by the inventive methods are never all of a precisely uniform size. The sizes, however, fall into a much tighter distribution of size than has previously been achieved or that have been achieved only by procedures that are too costly or too impractical to be adopted for commercial applications. Further, even if populations of particles that have been produced by grinding polymers are all of about the same size, they are not all of about the same shape. The present invention provides, for the first time, the ability to obtain populations of particles that are both of closely the same size and closely the same shape.

Figure 5A:
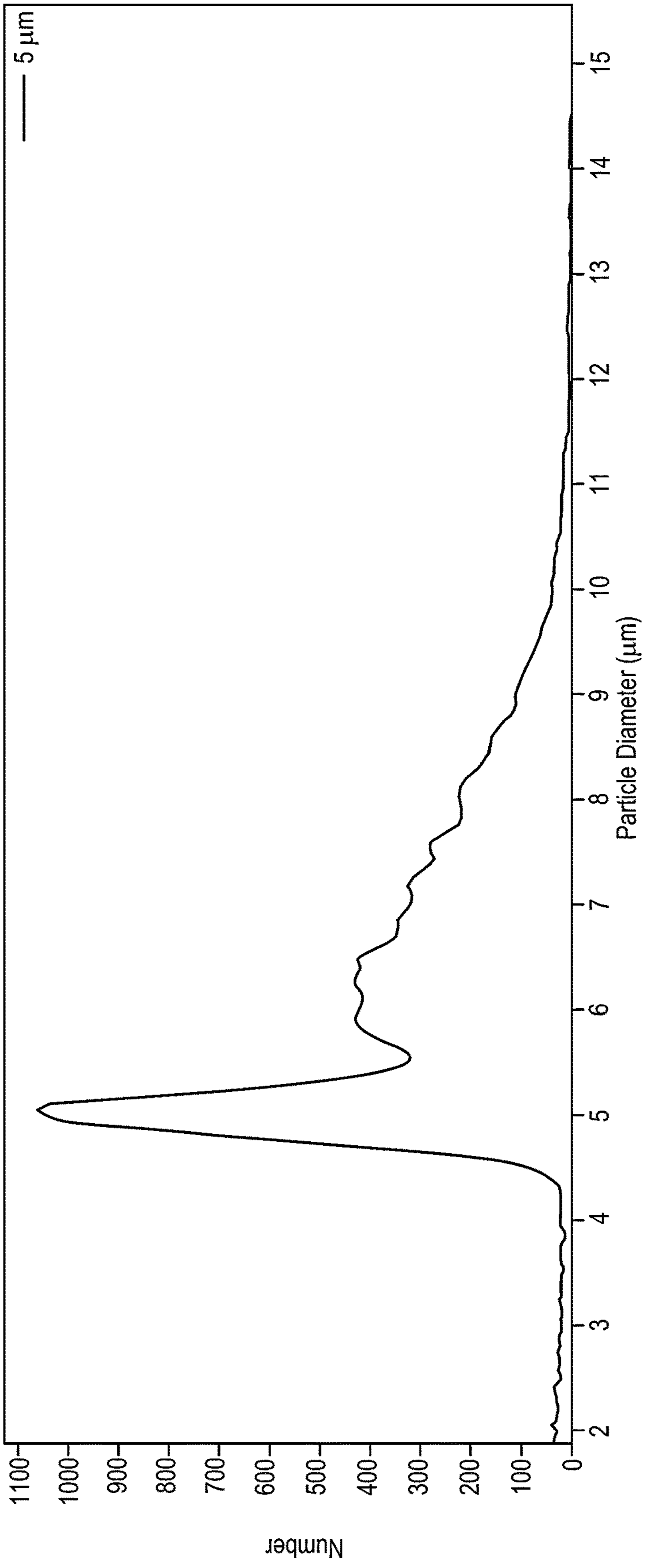
FIGS. 5A-B.
Figure 5B:
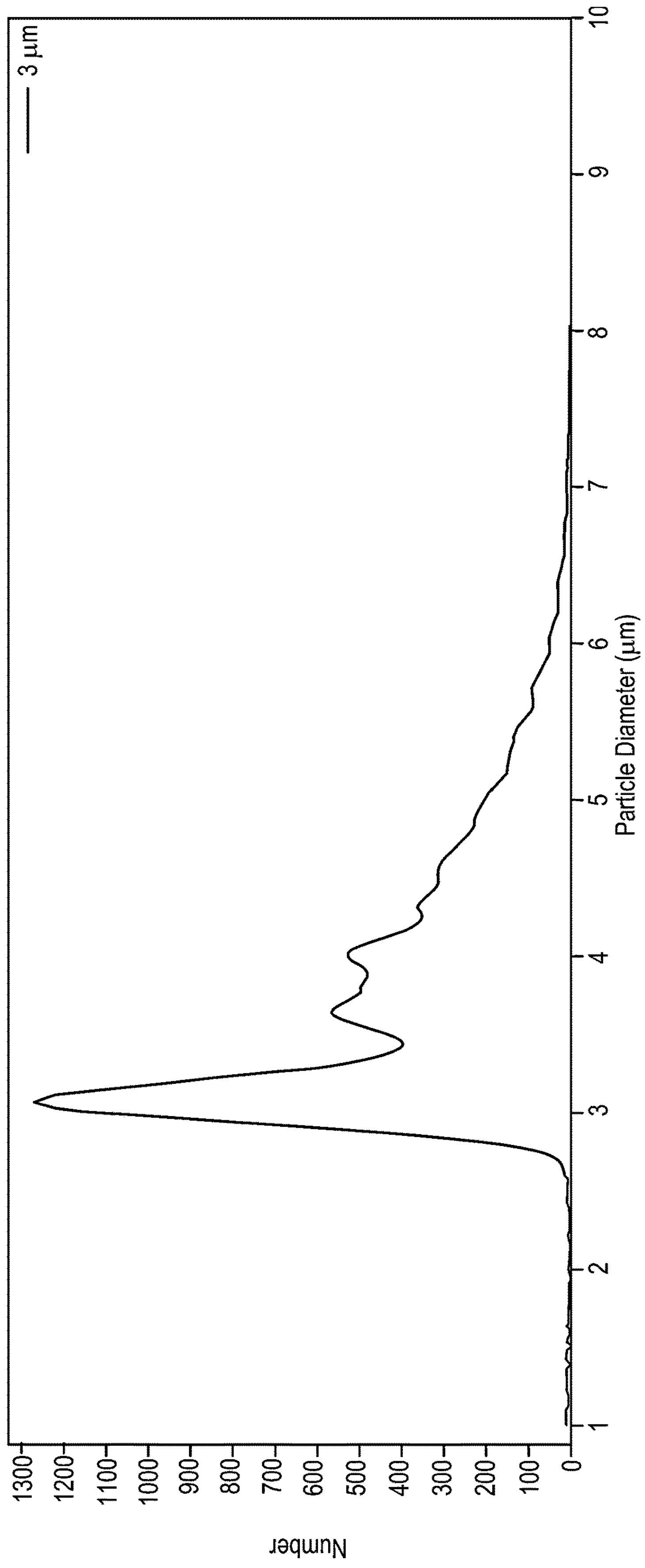

As used herein, the term "substantially monodisperse" with regard to the particle size of a population of particles means that the particles have a size distribution that is tightly clustered around a single size. As shown in FIGS. 5A and 5B, the size of the particles can be characterized by a main (modal) number average peak whose width at half height is 40% or less of the size of that main peak when the particles are well dispersed and measured using the Coulter Principle. Coulter Counter instruments are widely used to measure particle size distributions of industrial particulate materials that can be suspended in an electrolyte solution, and it is expected that the person of skill is well familiar both with the use and operation of such instruments to measure particle size distribution as well as the characteristics of measurements made with them, As persons of skill will appreciate, the main peak of such measurements can show some tailing due to fused/aggregated dimers and trimers of particles. The presence of some aggregates of particles does not change the fact that the particles themselves are substantially uniform in size, or the nature of the population of particles as having a particle size that is substantially monodisperse.

Figure 4:
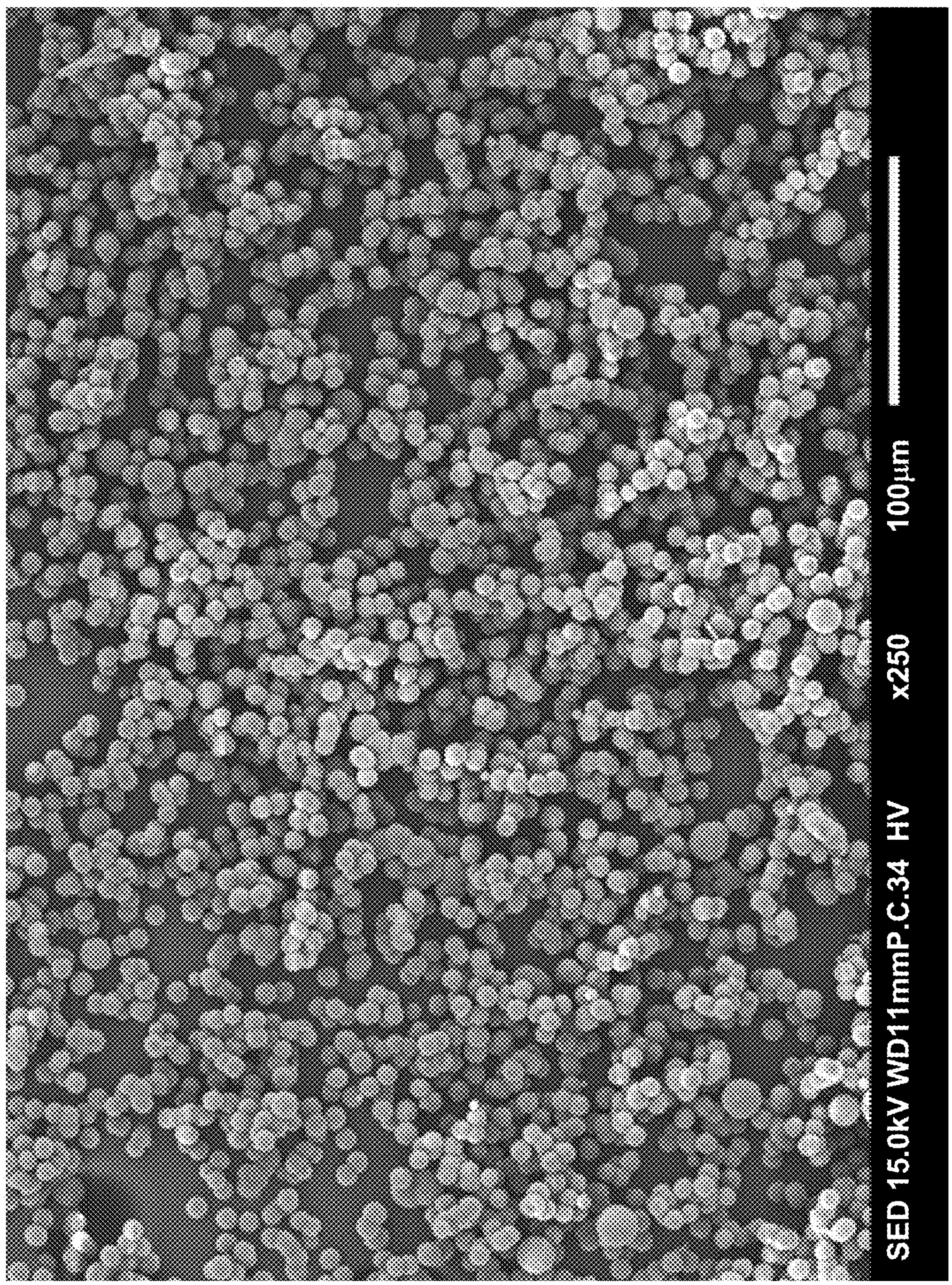
FIG. 4.

As used herein, the term "substantially spherical" with regard to particles of polyarylketones made by the inventive methods appear spherical to the eye when viewed at a magnification sufficient to view the shape of individual particles, as shown in the example set forth in FIG. 4.

Polyarylketones, Polyaryletherketones, and Thio-Analogues Thereof

As used herein, the term "polyarylketone" is intended to mean aromatic polymers in which at least some of the aromatic moieties forming the polymer chain are connected by ketone linkages but it is not intended to exclude polymers in which other linkages, may be selected from a direct link, —O—, —S—, —$SO_2$— or —$CR_2$— where R is hydrogen, $C_1$ to $C_4$ alkyl, phenyl or the two groups R (which otherwise may be the same or different) are joined externally to form a cycloaliphatic ring, are present. In an example the amount of —S—, —$SO_2$— or —$CR_2$— linkages present in the polymer is not sufficient to substantially affect the solvent resistance of the polymer (i.e. it exhibits similar insolubility to that of PEEK when compared to PEEK in a range of solvents).

Examples of polyarylketones for use in the invention are polyaryletherketones ("PAEKs") and polyarylthioetherketones. Polyaryletheretherketone is a an example of polyaryletherketone.

Methods of Making a Substantially Monodisperse Population of Particles

McGrath teaches in its Abstract that the "choice of acid and its concentrations affects the rate of ketimine hydrolysis of an amorphous polyarylketimine intermediate and subsequent particle formation. In addition, zero or reduced amounts of agitation during hydrolysis has been found to promote the formation of smaller (submicron) sized particles which are spherical in shape, while greater amounts of agitation . . . results in nonspherical, larger particles." McGrath, Abstract. McGrath's specific teachings regarding hydrolysis are set forth in column 7. McGrath presents its findings in Table 1, which sets forth the results of hydrolyzing what it calls polyarylketimine intermediates with the acid HCl at 0.036, 0.012, 0.006, and 0.001 moles of acid, showing that as the concentration of acid is lowered, the time for hydrolysis lengthens, with the 0.001 mole concentration resulting in hydrolysis taking approximately 3 hours. McGrath Table 1 also shows that the acid used makes a difference, as acetic acid at 0.052 mole did not cause cleavage when tested for over 10 days. Id.

McGrath does not set forth or suggest any relationship between hydrolysis time due to the acid concentration and the resulting size and shape of the resulting polyarylketone particles. McGrath does, however, state: "The conditions under which hydrolysis is performed dictate[ ] the particle size and shape. If the hydrolysis is conducted with little or no stirring, the particles are spherical and can be made as small as 0.5 μm in diameter. With agitation, the size of the particles can increase to the order of 5 μm." McGrath, col. 7, lines 50-55. Thus, McGrath teaches that, to obtain spherical particles, there should be "little or no stirring" and that to obtain particles as large as 5 μm, there should be agitation. Finally, McGrath teaches that the PEEK powders made by its methods "tend to aggregate" and that "the addition of a stabilizer is necessary to form a stable suspension and break up the aggregates." Cols. 7-8, bridging sentence.

Studies underlying the present disclosure revealed found that McGrath's teachings did not allow making populations of particles suitable for use in porous devices, as opposed to the external coatings for which McGrath's methods were developed. A series of substantial changes to McGrath's method were made that, in combination, surprisingly succeeded in making substantially monodisperse populations of substantially spherical polyarylketone particles and, further surprisingly, did so without producing the volumes of fines produced by the McGrath method.

The discussion below first presents the discoveries regarding how to modify the McGrath method to produce populations of particles with the desired characteristics, followed by a more detailed statement of specific embodiments.

First, while studies underlying the present disclosure confirm that strong acids should be used to cause hydrolysis of the polyarylketimine intermediates (or, more accurately, polyarylether ketimines), the studies further revealed that markedly reducing both the concentration of acid and the concentration of the polyarylether ketimines in the mixture to produce substantially monodisperse populations of substantially spherical polyarylketone particles. McGrath recognizes that the concentration of the acid and ratio to the moles of the intermediate present affects the rate of hydrolysis, but it does not explain or teach how that rate affects the size or shape of the particles produced. The studies reported herein discovered that decreasing both the concentration of the acid and that of the polyarylether ketimines allows controlling the size of the resulting particles, and at the same time assists in having the size of the resulting particles be substantially monodisperse. Without wishing to be bound by theory, it is believed that reducing the concentration of both reactants in a solution containing them results in both a slower nucleation of particles and a lower rate of interaction between the acid and the polyarylether ketimines, thus slowing the growth of the particles once they nucleate. Again without wishing to be bound by theory, it is believed that the low concentration of polyarylether ketimines allows particles to form that are substantially not stuck together or aggregated, as the low concentration of polymer in solution keeps the nuclei from forming in close proximity to one another, while the lower acid concentration slows down the rate of hydrolysis, allowing the solution containing the polyarylether ketimines and the acid to be briefly mixed to give a homogenous mixture of acid and polymer in solution without causing the polymer to start to precipitate out of solution. It is further believed that these changes to the kinetics of the reaction result in obtaining the populations of substantially monodisperse particle size observed in the studies reported herein.

Second, as noted above, the only teaching in McGrath regarding controlling the size of the particles is that, "with little or no stirring, the particles are spherical and can be made as small as 0.5 μm. With agitation, the size of the particles can increase to the order of 5 μm." To the contrary, studies underlying the present disclosure found that brief mixing of the solution as or just after the acid is added to a solution containing the ketimine intermediate, and then ceasing stirring, facilitates the controlled formation of particles of the desired size. It was further discovered that the size of the particles obtained could be controlled by controlling the % of unprotected keto-monomer added to the hydroquinone to form the protected copolymer being used to form the particles.

Third, McGrath focuses on the concentration of the acid in terms of the time for the resulting hydrolysis to go to completion, which it reported results particles "as small as 0.5 μm." This was not found to be guidance allowing the production of a population of particles of a monodisperse size distribution with few if any fines. Instead, it was found to be important to reduce both the concentration of the acid and the concentration of the ketimine intermediates. Without wishing to be bound by theory, it is believed that this causes both a slow nucleation of particles, and then a slow accretion or crystallization of polymers on to the nucleated particles, resulting in a population of substantially spherical particles with a monodisperse size, with few, if any, particles much smaller than the average size of the particles in the overall population.

Fourth, McGrath teaches that the powders produced by its method "form very unstable dispersions and the particles tend to aggregate." McGrath, col. 7, 11. 66-67. It therefore teaches that "the addition of a stabilizer is necessary to form a stable suspension and break up the aggregates." Id., cols. 7-8, bridging paragraph. Contrary to the teaching of McGrath, however, stabilizers are not only not "necessary" for making populations of polyaryletherketone particles for use in porous devices, but in fact may be omitted for use in making porous devices, which in some common embodiments, are used to prepare biological samples for analysis. Some of the stabilizers taught by McGrath could interact with analytes in the biological samples and reduce the reliability or accuracy of any subsequent analyses of the samples. Thus, in some examples, the solutions of acid and polyarylketimine intermediates used in the inventive methods do not contain a stabilizer or, if a stabilizer is used, contain the stabilizer only at levels too small to leave any stabilizer present on populations of particles made by the methods.

In some examples, the cleavage in an acid-containing solution of the acid-labile protecting group from the intermediates protected by an acid-labile protecting group, such as the exemplar polyaryletherketimine intermediates, occurs slowly. Without wishing to be bound by theory, it is believed that slow cleavage of the acid-labile protected intermediates provides the resulting polymer to accrete or crystallize onto the nucleated particles over time, allowing better control of the size of the particles in the population of particles being formed. Conditions for providing the desired slow cleavage of the acid-labile protecting group from intermediates protected by such a group, including mixing time of the intermediates in an acid-containing solution, suitable solvents, and suitable concentrations of acid, of co-polymer, of water, and of solvents, are discussed in some detail below.

Regarding mixing the acid with the solution of acid, or acid, with the solution containing the acid-labile protected intermediates, such as the exemplar polyaryletherketimine intermediates, it—may be for the acid to be evenly distributed throughout the solution containing the acid-labile protected intermediates so that the particles nucleate in disparate locations in the resulting mixture and grow evenly without bumping into each other and aggregating. For small volumes, the acid, or a solution in which the acid is present in the desired concentration (for convenience of reference, the term "acid solution" is sometimes used below to refer to either), can simply be added to the solution containing the acid-labile protected intermediates, (for convenience of reference, sometimes referred to below as the "ketimine solution" as the exemplar acid-labile protected polymeric intermediate) without mixing. For most uses, however, the acid will be mixed into the ketimine solution, to form what is sometimes referred to herein as a "cleavage reaction solution." Some water may be present in the cleavage reaction solution (typically by being present in the solution holding the ketimine intermediates), so that it is available to hydrolyze the protecting groups.

The acid and the solution holding the intermediates protected with an acid-labile protecting group, such as a ketimine, can be combined in any of several ways. For example, a container holding the solution containing the acid-labile protected intermediates, such as ketimines, can have the acid solution introduced through an opening in its top, by a spout having multiple small openings through which the acid solution is lightly drizzled or dripped over a wide area of the top of the container, so that all or most of the surface area of the opening receives the acid solution at the same time. As another example, the container may be provided with a number of ports disposed around the container. The acid solution can then be injected through the ports into the container from multiple ports, all at once or in a chosen sequence, distributing the acid solution throughout the vat. Conversely, the container can hold the acid solution, into which the solution containing the acid-labile protected intermediates, such as ketimines, is added as described above for the acid solution.

The acid solution may be introduced into the container holding the solution containing the acid-labile protected intermediates, such as ketimines, and briefly mixing the acid solution into the solution containing the acid-labile protected intermediates, to distribute the acid solution evenly throughout the resulting mixture, thereby forming a cleavage reaction solution. Conveniently, the mixing may be by stirring, vortexing, rotating, or sonicating the mixture, or swirling or rolling the container to create an even distribution of acid solution throughout the mixture, with the goal being to avoid having one or more areas of the mixture having a locally higher concentration of acid than the mixture in the rest of the container for more than a short interval of time.

"Briefly mixing" with regard to mixing the acid into the solution holding the ketimine intermediate means mixing for a short predetermined amount of time, such as for about 3 minutes or less, for example, for about two minutes or less, such as about 1½ minute or less. In some embodiments, it means about 1¼ minutes or less, about 1 minute, about 40 seconds, or about 30 seconds, or about 20 seconds, with "about" here meaning ±10 seconds after or as the acid solution is introduced into a container holding a solution comprising the polyarylketimine intermediates, or vice versa. As the practitioner will appreciate, hydrolysis of the polyarylketimine intermediate is not instantaneous throughout the mixture at the concentrations used in the inventive methods, so there is some time available for introducing the acid solution into the ketimine solution (or vice versa) and mixing the resulting mixture to create an even distribution of acid throughout the resulting mixture. In our studies, the acid was added to a briskly stirred solution of the ketimine-protected polymer, and the mixture stirred for one minute, after which stirring was stopped.

In some embodiments, the concentration of the acid in the cleavage reaction solution is from about 0.2 to about 20 mmol/liter. In some embodiments, the concentration of the acid in the cleavage reaction solution is from about 2 to about 5 mmol/liter. In some of these embodiments, the concentration of the acid is about 3.7 mmol/liter.

A further surprising discovery in the course of studies underlying the present disclosure that the size distribution of the particles can be better controlled by lowering the concentration of the polymer repeat unit for a ketimine-containing polymer in the cleavage reaction solution (wherein the polymer ketone groups may be fully or in part ketimine protected). As shown in FIG. 14, this results in significantly less tailing in the particle size distribution. In some embodiments, the concentration of the co-polymer in the cleavage reaction solution is less than 170 mmol equivalents of repeat unit/liter. In some embodiments, the concentration of the co-polymer in the cleavage reaction solution is from about 5 to about 75 mmol equivalents of repeat unit/liter. In some embodiments, the concentration of the co-polymer in the cleavage reaction solution is from about 10 to about 65 mmol equivalents of repeat unit/liter. In some embodiments, the concentration of the co-polymer in the cleavage reaction solution is from about 15 to about 50 mmol equivalents of repeat unit/liter. In some embodiments, the concentration of the co-polymer in the cleavage reaction solution is from about 18 to about 25 mmol equivalents of repeat unit/liter. In some embodiments, the concentration of the co-polymer in the cleavage reaction solution is from about 20 to about 21 mmol equivalents of repeat unit/liter.

In some embodiments, the amount of water present to affect the hydrolysis of the acid-labile protecting group is from an equimolar to a 100-fold excess to the moles of protecting groups found on the copolymer available to be cleaved.

In some embodiments, the solution holding the co-polymer contains as a solvent N,N-dimethylacetamide, N,N-dimethylformamide, N-methy-2-pyrrolidone, tetrahydrofuran, 2-methyl-tetrahydrofuran, dichlorobenzene, chlorobenzene, chloroform, dichloromethane, N-butyl-2-pyrrolidone, N-ethyl-2-pyrrolidone, furfural, γ-butyrolactone & γ-valerolactone, 1,3-dimethyl-2-imidazolidinone, N,N'-dimethylpropyleneurea, or a combination of two or more of these. In some embodiments, the solution holding the co-polymer contains as a solvent N-methyl-2-pyrrolidone, or "NMP." In some embodiments, the organic solvent is present in a mixture with water. In some embodiments, the solvent present in a mixture to water is NMP. The NMP can be present in the mixture with water in any ratio in which the prepolymer is soluble at the reaction temperature. In some embodiments, the mixture is of NMP and water in a ratio of from about 5:1 to about 330:1 (v/v). In some embodiments, the mixture is of NMP and water in a ratio of about 15-35:1 (v/v). In some embodiments, the mixture is of NMP and water in a ratio of about 20-25:1 (v/v). In some embodiments, the mixture is of NMP and water in a ratio of about 24.5±1:1 (v/v).

In some embodiments, the acid-labile protected copolymers have a molecular weight (Mw) relative to polystyrene standards of about 10,000 to about 75,000 Daltons. In some embodiments, the copolymers have a molecular weight (Mw) of about 26,000 to about 34,000 Daltons. In some embodiments, the copolymers have a molecular weight (Mw) of about 32,000 Daltons. In each of these embodiments, "about" means±1,000 Daltons. Use of polymer standards is well known by polymer chemists and use of such standards is taught in the art, such as in the publication: https://www.agilent.com/cs/library/primers/public/GPC-standardsPrimer_5991-2720EN.pdf.

Acids Suitable for Hydrolysis of the Protected Intermediate

In general, any strong acid can be used to cause the hydrolysis of the protected intermediate, such as the polyarylketimine intermediates discussed as exemplars above. Exemplar acids include hydrochloric acid, nitric acid, sulfuric acid, hydrobromic acid, hydroiodic acid, perchloric acid, trifluoroacetic acid, trichloroacetic acid, chlorobromoacetic acid, dichloroacetic acid, trifluoromethanesulfonic acid, methanesulfonic acid, benzenesulfonic acid and tosic acid (also referred to as "p-toluenesulfonic acid"). In an example, the strong acid is tosic acid; tosic acid has low volatility at ambient temperature and is available in solid form, making it easy to weigh out to obtain a desired acid concentration. In some embodiments, the strong acid has a pKa<3.

As the practitioner will appreciate, the acid serves to hydrolyze the acid-labile protecting group, such as the ketimine intermediate or, to state it another way, to cleave the ketimine group on the polyarylether ketimine intermediate to form polyarylether ketone.

Studies underlying the present disclosure also indicated that the temperature was a factor in reducing or increasing the number of fines generated. In studies in which duplicate reactions were conducted at 20° C., 40° C., 60° C., and 80° C., it was found that 60° C. generated the lowest number of fines. Accordingly, in some embodiments, the hydrolysis is conducted at a temperature of from about 5° C. to about 90° C., such as from about 50° C. to about 70° C., where "about" means±5° C. In some embodiments, the hydrolysis is conducted at a temperature of about 60° C. where "about" means±5° C. In some embodiments, the hydrolysis is conducted at a temperature of about 60° C., where "about" means±2° C.

In some embodiments, the polyarylketone polymer is poly ether ether ketone ("PEEK").

Polyaryletherketone Monomers and the Importance of Monomer Purity

The studies underlying the present disclosure used substituted difluoro-monomers of an exemplar polyaryletherketone, PEEK. As practitioners are aware, 4,4' Dichlorobenzophenone is also used in the production of PEEK and is expected to work in the methods described herein. 4,4' Difluorobenzophenone and 4,4' Dichlorobenzophenone are some examples.

In some embodiments, the substituted monomers can be selected from compounds having the structure:

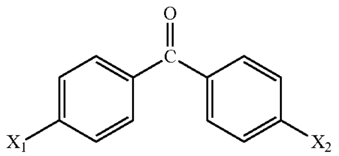

wherein $X_1$ and $X_2$ each represent a halogen selected from fluorine, chlorine, bromine, or iodine, and the two halogens may be the same or different. Specific examples of such dihalo-aromatic ketone compounds include, in addition to 4,4'-difluorobenzophenone and 4,4'-dichlorobenzophenone, 4,4'-dibromobenzophenone, 4,4'-diiodobenzophenone, 4-fluoro-4'-chlorobenzophenone, 4-fluoro-4'-bromobenzophenone, 4-fluoro-4'-iodobenzophenone, 4-chloro-4'-bromobenzophenone, 4-chloro-4'-iodobenzophenone and 4-bromo-4'-iodobenzophenone. These dihalo-aromatic ketone compounds may be used individually, or two or more thereof may be used as a mixture. For convenience of reference, the substituted monomers named above are sometimes referred to herein as "dihaloketone monomers" or as "dihalo-monomers."

The studies reported herein also revealed that the purity of the dihalo-monomers, as measured by mol %, is important to producing polymers of molecular weights desirable for producing monodisperse population of substantially spherical particles of polyarylketone polymer of a selected diameter. Any impurities in the dihalo-ketone monomers can modify the crystalline structure and solubility of the resulting polymer. Without wishing to be bound by theory, it is believed that the purity of the dihalo-ketone monomers has an effect on how and when nucleation occurs during the hydrolysis step, ultimately affecting both particle size and morphology. When referring to purity of the monomer, percentages are measured in mol %. Accordingly, in some examples, the monomers have a purity of at least 95% pure, 96% pure, 97% pure, 98% pure, or 99% or more. Further, the purity of the co-polymer produced using the monomers is also very important to producing the desired monodisperse population of particles. When referring to the purity of the polymers, the percentages are measured in weight %.

The discussion below now turns to describing in more detail some embodiments of the invention for making a monodisperse population of substantially spherical particles of polyaryletherketone ("PAEK") polymer, or thio-ether analogue of a PAEK polymer, of a chosen (selected) diameter. For purposes of the present disclosure, the term "thioether analogue of a PAEK polymer" refers to a PAEK polymer in which the oxygen forming the "bridge" that defines an ether is replaced by a thioether sulfur bridge in the structure.

First, the dihalo-ketone monomers have their ketone groups protected with an acid-labile protecting group. Various chemistries are known for providing an acid-labile protecting group on the ketone functionality or functionalities, including, for example, a ketal, thioketal or dithioketal formed, respectively, from a corresponding aliphatic diol, mercapto-alcohol or dithiol. In some examples, the dihaloketone monomers are reacted with aniline to form imines. For convenience of reference, the discussion below will generally refer to protection with aniline to form imines Persons of skill will appreciate, however, that the discussion also pertains equally to protecting the ketone using one of the other acid-labile protecting groups known in the art, and can be used in place of the imine group discussed herein. Any particular acid-labile protecting group can be tested for its suitability for use in the inventive methods by substituting it for the imine-functionality discussed herein, otherwise following the methods shown in the Examples for making particles, and seeing if the method results in a substantially monodisperse population of a size of from about 1 to about 10 microns and that are substantially spherical.

Second, the resulting protected dihalo-imine monomers are then copolymerized with hydroquinone to form a keto-protected polyarylether (the ketone group being protected as the imine with aniline—carried through from the dihalo-monomer utilized).

Figure 3:
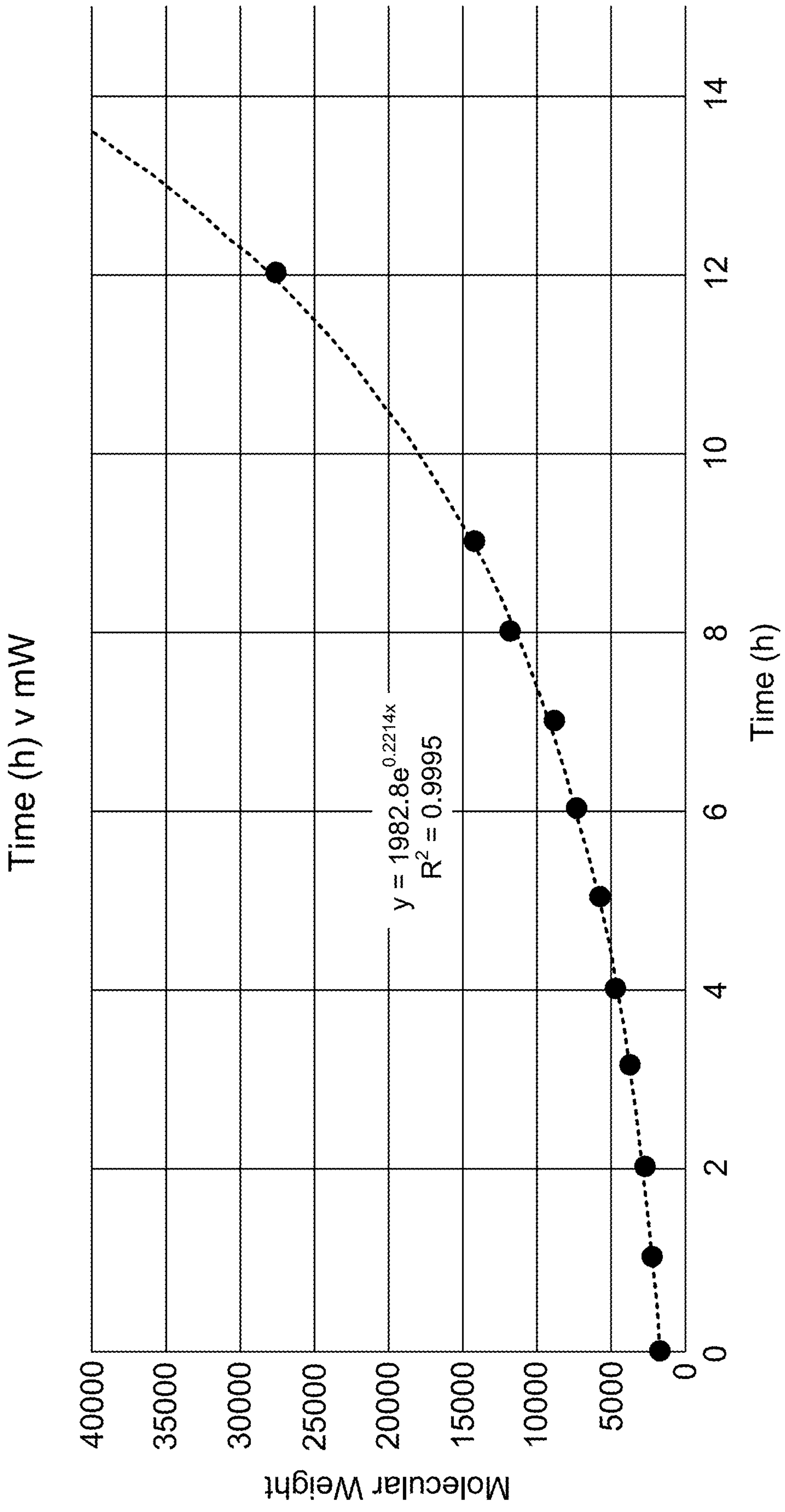
FIG. 3.

Third, the copolymerization reaction is run until the molecular weight of the copolymer in the reaction mixture reaches a desired molecular weight in Daltons ("mol. wt." or "Mw") by gel permeation chromatography ("GPC," also referred to as size exclusion chromatography, or "SEC"), relative to polystyrene standards. As shown in FIG. 3, this is done by multiple samplings of the reaction mixture "in process" and extrapolating to find the time needed for the polymer to grow to the desired molecular weight. As persons of skill will appreciate, this measure for determining molecular weight provides what is known as "weight average molecular weight," or "Mw," as opposed to the measure known as "peak molecular weight," or "Mp" and that known as "number average molecular weight," or "Mn." It is expected that Mw will be the standard method used for determining molecular weight for the copolymers discussed herein, except in special cases in which only narrow polymer standards are available, in which case Mp might be more suitable. It is further expected that persons of skill in the art are familiar with the methods for determining molecular weight of particular polymers of interest and can select an appropriate method given any particular polymer and any particular set of polymer standards.

For forming a substantially monodisperse population of substantially spherical particles of polyarylketone, the desired molecular weight is from about 20,000 to about 200,000 Daltons, 22,000 to about 100,000 Daltons, 25,000 to about 75,000 Daltons, 27,000 to about 60,000 Daltons, 28,000 to about 50,000 Daltons, 29,000 to about 45,000 Daltons, 30,000 to about 40,000 Daltons, with "about" in each of the preceding recitations meaning ±5,000 Daltons. In some embodiments, the copolymerization reaction is run until the molecular weight of the copolymer is from about 26,000 to about 36,000 Daltons, or 27,500 to about 35,000 Daltons, with "about" in the recitations in this sentence meaning ±2,500 Daltons. In some embodiments, the copolymerization reaction is run until the molecular weight of the copolymer is from about 31,000 to about 34,000 Daltons, about 31,000 to about 33,000 Daltons, or about 32,000 Daltons, with "about" in this sentence meaning ±500 Daltons. Again, for clarity, it is noted that the molecular weights are relative to polystyrene standards rather than absolute measurements. For polymers such as ketimine-protected PEEK, no convenient range of standards is commercially available. It is therefore common practice in the art to determine the molecular weight of such polymers relative to a set of standards for a different polymer (such as polystyrene, polymethylmethacrylate, or polyethyleneoxide) that is commercially available, compatible with the chosen analytical solvent system, and that have been run under the same chromatographic conditions on the same instrument being used for the GPC/SEC analysis.

The studies reported herein discovered that co-polymerizing protected dihalo-monomers with hydroquinone results in a distinctive particle size being produced during the following protecting-group cleavage reaction whereas, if a portion of the protected dihalo-monomer is substituted with an equimolar proportion of the unprotected ketone form of the dihalo-monomer in the copolymerization with hydroquinone, then smaller particle sizes (with reference to the distinctive particle size) can controllably be produced during the later protecting group cleavage reaction. The copolymerization results in the formation of a keto-protected polyarylether ketone—optionally with polyarylether ketone content in a selected ratio of mole percentage of keto-protected polyarylether ketone to mole percentage of keto-unprotected polyarylether ketones.

Table 1, below, shows that the size of particles obtained at the end of the process was from about 8 to about 8.5 microns when no unprotected monomers were included in the co-polymerization, was 5.2-5.7 microns when 90% protected monomers were present (indicating that 10% of the monomers were unprotected), 1.6 microns when 80% of the monomers were protected and 20% were unprotected, and smaller than 1.6 microns when 75% of the monomers were protected and 25% were unprotected. Particles of sizes of from about 1.6 microns to about 5.2 microns can be made by including in the co-polymerization unprotected monomers in a percentage smaller than 20% but larger than 10%, while particles of sizes of from about 5.7 to about 7.9 can be obtained by including unprotected monomers in a percentage smaller than 10% but larger than 0. While there is some variation in the size of the particles from batch to batch, within each batch, the size of the population of particles is substantially monodisperse. Alternatively, particles may be produced by mixing multiple batches to produce particles of a desired size. For example, particles may be produced by mixing multiple batches to alter the particle size—e.g., a 50:50 wt:wt mix of 100% and 75% protected monomers would produce particles of a selected size of from about 8 to about 1.6 μm.

Fourth, the co-polymer from the preceding step is then hydrolyzed in a dilute solution with dilute strong acid. Water can either be added to the reaction solvent or already be present with the acid (e.g., an aqueous solution of HCl), or both for hydrolysis. For convenience of reference, the mix of the solution with the co-polymer, the dilute strong acid, and water is sometimes referred to herein as the "cleavage reaction solution." The polyarylketone resulting from the hydrolysis is very poorly soluble in the aqueous solution; thus, when its metastable (saturation) limit is reached, it comes out of solution and forms nuclei onto which further hydrolyzed polymer accretes, creating uniform, spherical particles of polyarylketone.

The dilute strong acid may be present in the cleavage reaction solution at from about 0.2 to about 20 mmol/liter. In some embodiments, it is present in the cleavage reaction solution at from about 2 to about 5 mmol/liter. In some embodiments, the dilute concentration of co-polymer in the cleavage reaction solution is less than about 170 mmol equivalents of repeat unit/liter. In some embodiments, the concentration of co-polymer in the final cleavage reaction is from about 65 to about 75 mmol equivalents of repeat unit/liter. In some embodiments, the concentration of the co-polymer in the cleavage reaction solution is about 67.6 mmol/L. In some embodiments, the amount of water present to effect the hydrolysis is from about an equimolar to about 100 fold excess to the moles of protecting groups found on said copolymer available to be cleaved.

To provide good results, the copolymer formed in the preceding step may have a purity of about 95% or more. The process set forth above results in particles that can be made up to approximately 10 microns.

It has previously been reported that the presence of unprotected polymer incorporated into the co-polymer gives smaller particle sizes. It is, however, a surprising finding underlying the present invention that controlling the conditions as discussed herein allows controlling the size of particles with a near-linear relationship between unprotected monomer content and in the copolymer and particle size.

The practitioner can, following the methods set forth above, determine the time of hydrolysis that will produce a monodisperse population of substantially spherical particles of polyarylketone polymer of any particular preselected diameter from, for example, 1 micron to 10 microns, with any particular acid selected from the list set forth above, and any particular concentration of acid within those stated, with a particular PAEK polymer, or thio-analogue of a PAEK polymer, of choice, by simply running iterations of the method set forth above using the selected reagents and measuring the diameters of samples of the resulting particles at selected ratios of protected to non-protected monomers and making note of the diameter of the particles in the sample at each selected ratio using that particular selection of reagents. Table 1 and FIG. 2 show the particle size obtained at selected ratios of protected to unprotected groups using as an exemplar embodiment protected groups derived from the ketimine of aniline with 4,4'-difluorobenzophenone monomer and unprotected groups derived from 4,4'-difluorobenzophenone monomer.

TABLE 1

| Batch | Protected Groups (mol %) | Coulter Particle Size (μm) |
|---|---|---|
| 016-1-1 | 100 | 8.1 |
| 016-1-2 | 100 | 8.3 |
| 016-1-3 | 100 | 8.6 |
| 016-1-4 | 100 | 8.8 |
| 017-1-2 | 100 | 8.0 |
| 017-1-3 | 100 | 7.9 |
| 017-1-4 | 100 | 7.9 |
| 017-C1-1 | 90 | 5.2 |
| 017-C1-2 | 90 | 5.7 |
| 017-C1-3 | 90 | 5.6 |
| 017-C1-4 | 90 | 5.7 |
| 017-C2-2 | 80 | 1.6 |
| 017-C2-3 | 80 | 1.6 |
| 017-C2-4 | 80 | 1.6 |
| 017-C3-2 | 75 | smaller than 1.5 μm |
| 017-C3-3 | 75 | smaller than 1.5 μm |
| 017-C3-4 | 75 | smaller than 1.5 μm |

Figure 2:
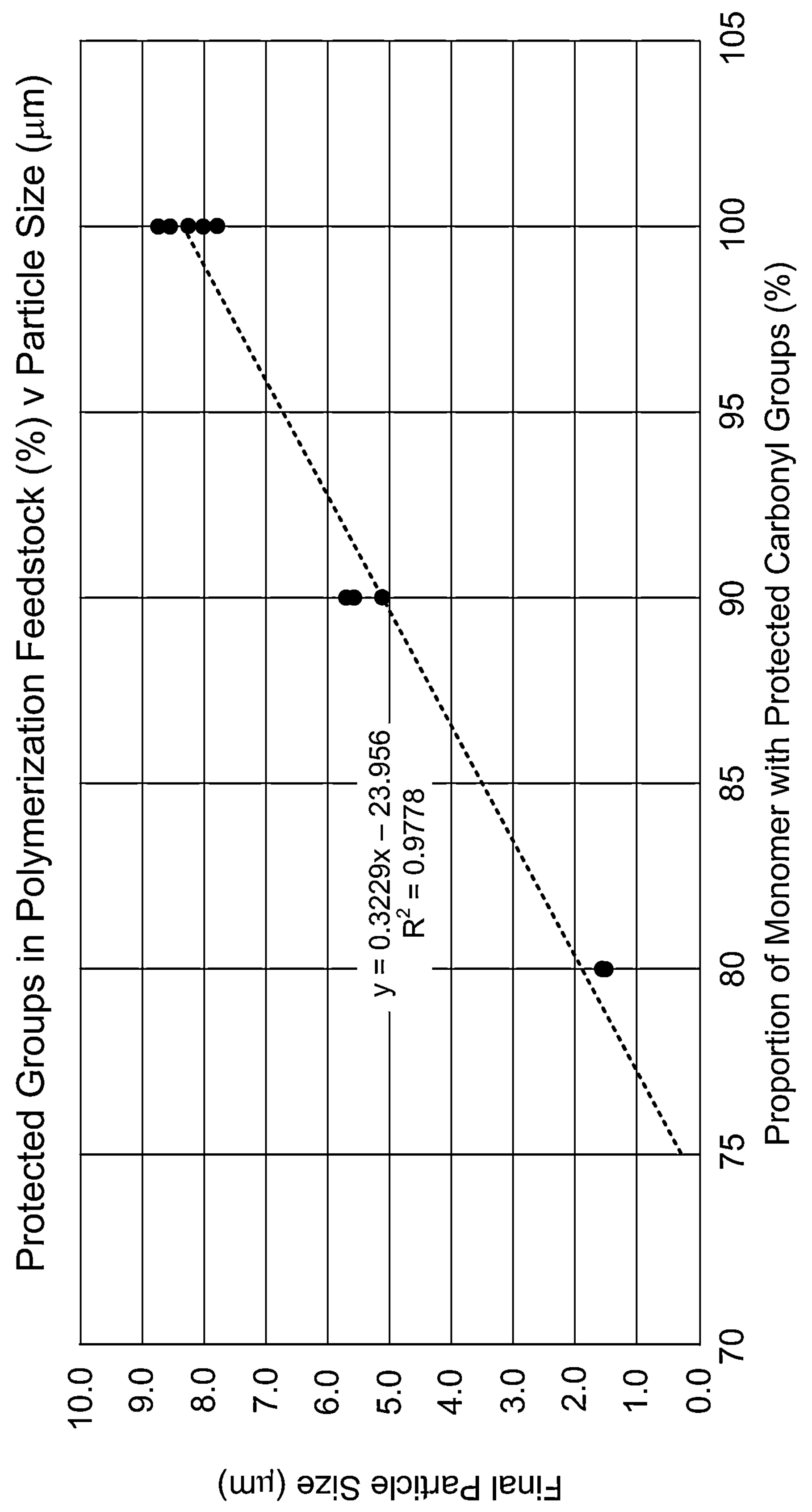
FIG. 2.

FIG. 2 shows the data presented in Table 1 in the form of a graph.

Making the Particle Populations Into Porous Devices

In some embodiments, the substantially monodisperse population of substantially spherical particles of polyarylketone polymer of a preselected diameter produced by the inventive methods is formed into a porous device. In some embodiments, the porous device is a frit, filter, membrane, or monoliths. It should be noted that each of these types of devices has a usage known to, and understood by, practitioners in the art and many examples are commercially available. Frits are typically cylindrically-shaped (often thin and disc-shaped) filters with selected porosity and other characteristics. For example, Biotech USA LLC (Minneapolis, MN) states that it has HPLC frits designed for use with analytical columns, semi-preparative columns, and preparative columns, in a variety of sizes of frit disc, available in numerous porosities. Filters, and especially filters upstream of the chromatographic column ("prefilters"), may also be used in such systems (and in other kinds of systems) to capture particulates in the solvent or other fluid which might otherwise damage or clog the system. Such prefilters are often used, even though the column typically has a frit at the head of the column, as it is much easier and economical to change a prefilter than it is to change a frit without disturbing the column's packing material. For columns in which the frit is press-fit and cannot be replaced, use of a prefilter can avoid having to replace an entire column.

The product literature for some commercially available PEEK frits, such as the brochure for frits from Biotech USA, LLC, state that they come in sizes such as 0.5, 2.5, and 10 microns. It is believed that the brochures are referring to nominal, rather than the actual or effective pore sizes, and that the size of the PEEK particles from which the frits are made are much larger. To make frits, in-line filters, or other porous devices of about 2 μm or smaller from these large, irregularly shaped particles, considerable pressure needs to be applied to compress them together, resulting in restricted pathways, higher back pressure, and a potential to clog.

The populations of particles can be shaped into frits, filters (such as in-line filters or prefilters), membranes, or monoliths by conventional means. It is assumed that practitioners are familiar with methods for shaping such devices and that a detailed explanation is not necessary. Some aspects, however, are discussed below.

In some embodiments, polyaryletherketone particles, such as polyetheretherketone particles, may be formed into a membrane. Such membranes can be used, for example, to line the sides of a metal chromatographic column or of a metal solid-phase extraction cartridge to reduce the interaction of solutes in a biological sample with the metal sides of the column or cartridge as the solutes flow through. Porous membranes can also be used for separatory applications, including microfiltration and ultrafiltration.

Typically, the shaping is by packing the particles into a mold or a die and then pressing the particles in the die. For a frit, the particles are compressed in the die into a flat disc, as taught in, for example, Bailey, U.S. Pat. No. 5,651,931 (hereafter, "Bailey" or the "Bailey patent"). In the study reported in Example 4, below, PEEK particles were formed into frits using a commercial FTIR ⅜" bolt press.

Studies reported herein found that the particles made by the methods described above are more ductile than particles of PEEK made by grinding PEEK blocks. The PEEK particles prepared by the process above are semi-crystalline, however that crystallinity is disordered, and the particles are malleable. When pressed together, the particles readily stick together into a shape without that shape breaking or cracking and then hold that shape to allow further handling. Accordingly, for similar effective pore sizes, less force is needed to press the inventive particles into shapes than is needed to press larger ground PEEK particles together. This is another surprising advantage of populations of particles made by the inventive methods, as the lower force needed to form them into the shape of the porous devices causes less distortion in the shape of the substantially spherical particles, and helps achieve a pore size that is consistent throughout the porous device. Further, once placed in a die or mold and pressed together, the inventive particles tend to stick together as they are removed from the die or mold in preparation for later steps, such as introducing them into an oven for sintering (the sintering or annealing process then surprisingly renders devices made from the inventive particles stronger than frits made from ground particles, as discussed further below).

In some embodiments, the porous devices are formed by obtaining substantially monodisperse population of substantially spherical particles of polyarylether ketone polymer or of a thio-analogue of such a polymer, of a selected diameter, placing the particles in the interior of a mold, a die, or of another container (collectively, "container") whose interior has the shape of the desired device, and pressing the particles in the container with a pressure from about 5 $N/mm^2$ to about 200 $N/mm^2$. In some embodiments, the particles are pressed in the container with a force of from about 10 $N/mm^2$ to about 40 $N/mm^2$. In some embodiments, the device is a frit, and the method comprises (a) obtaining a substantially monodisperse population of substantially spherical particles of polyaryletherketone polymer or of a thio-analogue of such a polymer in a container, (b) pressing the substantially monodisperse population of substantially spherical particles of the polymer in the container, and then (c) sintering or otherwise bonding the substantially monodisperse population of substantially spherical particles to one another, thereby manufacturing the frit. Once pressed in the container, the particles can be sintered or otherwise bonded to one another while in the container, or can be carefully removed from the container to avoid disrupting the shape into which they have been pressed and then sintered or otherwise bonded to one another.

Making, Sintering, and Cooling, Porous Devices

In some embodiments, such as frits and filters, the porous devices are made of populations of particles which have been sintered or otherwise bonded to one another. (As noted in the preceding section, particles made by the inventive methods have a tendency to aggregate. The term "bonded" is intended in this section to refer to more permanent connections between the particles than mere aggregation or stickiness.)

Wikipedia defines sintering as follows: "[s]intering or frittage is the process of compacting and forming a solid mass of material by heat or pressure without melting it to the point of liquefaction." (Citations omitted). Temperatures for sintering polyarylketones, including PEEK, have been well known in the art for decades. For example, the Bailey patent, which issued in 1997, teaches heating PEEK particles in an oven to approximately 340° C.±2° C., which it calls "substantially 340° C." Bailey, supra, at col. 6, bottom paragraph. Bailey teaches heating the PEEK particles at a rate of 75° C. per minute and holding the PEEK particles at substantially 340° C. for at least 30 minutes and then removing "the now-sintered PEEK particles," "now forming a filter", from the oven and allowing them to "sit in an open area to air cool at room temperature." Bailey, supra, at col. 7, lines 5-10. Temperatures for any particular polyarylketone other than PEEK are dependent on the melting temperature for the particular polyarylketone, whereas times at temperature will depend on to some degree on the size and shape of the object being sintered and the heating rate; and if sintered within a mold or other container, will also depend in part on the size, shape, and configuration of the mold or other container. Appropriate sintering temperatures will typically be in the region immediately below the material's melting peak temperature, often in the region between the melting onset-temperature and the melting peak temperature, which can be measured by differential scanning calorimetry, or "DSC." Sintering temperatures suitable for any particular polyarylketone, and of that polyarylketone in a mold or other container of any desired size, shape, and configuration, can be readily determined by testing routine in the art.

Studies conducted in which PEEK particles made by the inventive methods were formed into a frit in a hydraulic press, removed from the mold and then sintered in a tray, good results were obtained by heating the frits to 335° C. for 4 hours. Additional studies found that frits could also be made by heating the molded particles to 340° C. for 4 hours or for 8 hours, or to 335° C. for 8 hours. While frits made under the three latter conditions were a little darker in color, they were suitable for use as frits.

The Bailey patent teaches that, after the PEEK powder (particles) has been heated to "substantially 340° C. for at least thirty minutes, the now-sintered PEEK powder . . . should be removed from the oven . . . and allowed to sit in an open area to air cool at room temperature." Bailey, at col. 7, 11. 5-10.

Frits made with the inventive substantially monodisperse populations of particle as exemplar embodiments of porous devices proved to be stronger (more resistant to fractures) than current commercially available frits. Without wishing to be bound by theory, it is believed that the significant increases in strength of the frits made as exemplar porous devices by the methods taught herein is due in part from the uniform size distribution and spherical shape of the particles that allow the particles to better bind during the sintering process. Again without wishing to be bound by theory, the increase in strength in some embodiments is due in part by the improved heating and cooling methods discussed below. Current commercial PEEK frits are believed to be cooled post-sintering by air cooling either outside an oven or, in ovens having a cooling fan built into them, using the cooling fan built into the oven. In some embodiments, the inventive porous devices can be cooled by conventional exposure to room temperature or by a cooling system in an oven. When the devices are heated in a gas chromatography ("GC") oven, which are routinely equipped with a fan, the speed of the cooling can be increased by running the fan. The fan in such ovens can cool at approximately 100° C./min and therefore can cool samples down to room temperature very quickly, as opposed to the Bailey method, which employs air cooling the devices outside the oven. Alternatively, other rapid cooling methods can be used, for example, by placing a sample on or between cooling plates and circulating cooling fluid (e.g., water) through the cooling plates. Such rapid cooling techniques prevents crystallization of polyaryletherketones, such as PEEK, that have just been sintered and, as such, improves their ductility, or "compliance." (As used herein, the phrases "rapid cooling," "active cooling," "forced cooling," and "fast cooling" are used interchangeably, unless otherwise specified or required by context.) In some embodiments, such as assembling a chromatography column containing a frit or filter, it is advantageous for the frit or filter, to have good ductility. To ensure that the frit, filter, or other porous device in such embodiments fits tightly in the column, the porous device typically has a slightly larger diameter than that of the column. It is advantageous for the edges of the porous device to be able to deform slightly so that it fit tightly into the column without fracturing or cracking. (Frit fracturing or cracking can cause gaps or irregularities through which solutes or particulates can move without being filtered by the full thickness of the frit or filter.) Accordingly, porous devices that are both fracture-resistant, yet ductile, are more useful as components for assembly into columns and systems for separating analytes or filtering particles from solutions containing them.

A study was further conducted in which the exemplar polyaryletherketone PEEK was sintered and then cooled in a differential scanning calorimetry ("DSC") instrument at 10° C./min. The DSC cooling trace showed a crystallization event. It is believed that crystallization across the (now sintered) particle-particle boundaries form a stronger frit structure than porous devices cooled by either air cooling or the 100° C./min rate caused by forced cooling in a GC oven. Accordingly, it is believed that in some embodiments, porous devices, such as frits, can be made stronger by cooling at rates of from about 20° C./min to about 5° C./min, and will result in frits and other porous devices that are stronger than those currently commercially available. In some embodiments, therefore, the cooling is at a rate of from about 20° C./min down to 5° C./min. In some embodiments, the cooling is at a rate of about 8° C./min. As shown in FIGS. 11 and 12, cooling at a rate of about 8° C./min produced frits that were about 20% stronger axially and about 15% stronger radially in crush tests than frits cooled at a rate of 100° C./min.

It has further been discovered, however, that changing the method of cooling from that taught by Bailey surprisingly changes the strength of the porous devices (in this case, exemplar frits) being tested. Surprisingly, allowing the just-sintered frits to cool overnight in the oven in which they had been heated (and thus was cooling from the same temperature as the frits themselves) resulted in frits that were notably more fracture resistant in crush tests (that is, they have a higher "fracture strength") than those made by air cooling, as taught by Bailey over two decades ago. As shown in FIGS. 11 and 12, exemplar frits cooled in a GC oven at 0.3° C./min had a fracture strength of about 45% higher axially and about 25% higher radially than the ones cooled at 100° C./min Therefore, this "slow cooling" of just-sintered porous devices made of polyarylketones such as PEEK, to ambient temperature, in an insulated container, provide porous devices with a surprising and previously unknown and unrecognized advantage.

It has also been discovered, that changing the method of rapid heat-up (100° C./min) to the sintering temperature from that taught by Bailey changes the strength of the porous devices being tested. Surprisingly, allowing the pre-sintered frits to heat up at a much slower rate to the sintering temperature resulted in higher fracture strengths. Exemplar frits that were heated up at 0.5° C./min had about 20% higher fracture strength axially and about 15% higher fracture strength radially compared to the frits being heated up at 25° C./min Therefore, a "slow heating" of pre-sintered porous devices made of polyarylketones such as PEEK, to the sintering temperature, provides the porous devices with a yet another surprising and previously unknown and unrecognized advantage. In combination with the findings of the respective benefits of fast and slow cooling discussed in the above paragraphs, in some aspects, the invention provides the practitioner with the ability to tune the properties of the porous devices as needed for a particular use by choosing a speed of heating or cooling the devices, or both, to maximize their strength, to maximize their ductility, or to achieve a balance of these properties suitable for the intended use. It is expected that, in light of this disclosure's teachings of the benefits of slow versus fast heating, and of slow versus fast cooling, practitioners can readily determine combinations of rates of heating and of cooling that provide them with porous devices that have resistance to fracture, ductility, or both, suitable for the intended use of the porous device.

Thus, in another aspect, the invention relates to making porous devices comprising a substantially monodisperse population of substantially spherical particles of polyarylketone polymer having a melting temperature, which particles are about 10 μm or smaller in diameter, wherein a majority of the particles in the population have been sintered or otherwise bonded to other members of the population. In some embodiments, the particles are from about less than 0.5 μm to about over 5 μm in diameter, such as from about 1 to about 10 μm in diameter. In some embodiments, the particles are from about 2 to about 9 μm in diameter. In some embodiments, the particles are from about 4 to about 8 μm in diameter. In some embodiments, the particles are over 5 to about 6 μm in diameter. In some embodiments, the polyarylketone polymer is poly ether ether ketone ("PEEK").

In some embodiments, the porous device is a membrane, monolith, frit, or filter. In some embodiments, the device is a frit. In some aspects, the invention provides frits with bubble-point pressures higher than those that available with current commercial frits. In some embodiments, the frit is a liquid chromatography frit, optionally, a high-performance liquid chromatography frit. In some embodiments, the particles of the frit are of PEEK. In some embodiments, the frit has a bubble-point pressure of from about 2 to about 100 inches of mercury, with "about" with respect to bubble-point pressure in this paragraph meaning ±0.5 inch. In some embodiments, the frit has a bubble-point pressure of from about 3 to about 30 inches of mercury, while in some it has a bubble-point pressure of about 13 to about 30. In some embodiments, the frit has a bubble-point pressure of from about 7 to about 13 inches of mercury. In some embodiments, the device is a frit or filter and has a fracture strength of greater than about 30 N crush force radially (i.e. on edge) for a 2.1 mm diameter×1.55 mm thickness sample (all the radial crush forces stated below are for an exemplar sample with this diameter and thickness), and is preferably about 40 N or greater. In some of these embodiments, the frit or filter has a fracture strength of greater than about 30 N to about 120 N crush force, radially. In some embodiments, the frit or filter has a fracture strength of from about 40 N to 120 N or more radially. In some embodiments, the frit or filter has a fracture strength of from about 40 N to about 100 N radially. In some embodiments, the frit or filter has a fracture strength of from about 40 N to about 90 N radially. In some embodiments, the frit or filter has a fracture strength of from about 40 N to about 80 N radially. In some embodiments, the frit or filter has a fracture strength of from about 40 N to about 70 N radially. In some embodiments, the frit or filter has a fracture strength of about 70N to about 120 N crush force radially. In some embodiments, the frit or filter has a fracture strength of greater than about 40 MPa axially for an exemplar sample with a 2.1 mm diameter (references to fracture strength measured axially below refer to an exemplar sample of this diameter). In some embodiments, the frit or filter has a fracture strength of about 40 MPa to about 175 MPa axially (175 MPa is approximately the limit to which current instruments can measure axial force for porous devices of the exemplar diameter specified). In some embodiments, the frit or filter has a fracture strength of about 40 MPa to about 150 MPa axially. In some embodiments, the frit or filter has a fracture strength of about 40 MPa to about 100 MPa. In some embodiments, the frit or filter has a fracture strength of about 100 MPa to about 150 MPa. In some embodiments, the frit or filter has a fracture strength of about 150 MPa to about 175 MPa axially. With respect to fracture strength, "about" is used above as meaning ±1 N, when referring to radial force, or as meaning ±1 MPa, when referring to axial force. The combination of increased range of available bubble-point pressures and strength is another advantage of the porous devices of some embodiments of the invention.

In some embodiments, the particles of the monodisperse population have been sintered by slowly heating the particles to a selected temperature around the melting temperature of the particles, held at the selected temperature for a selected period of time, and then slowly cooled to ambient temperature. In some embodiments, the selected period of time is about 1 hour to about 24 hours. In some embodiments, the selected period of time is about 3 hours to about 8 hours. In some embodiments, the cooling is at a rate of from about 100° C./min down to about 0.25° C./min. In some embodiments, the cooling is at a rate of from about 25° C./min down to about 0.5° C./min, such as from about 10° C./min down to about 0.5° C./min. In some embodiments, the heating is at a rate of from about 100° C./min down to about 0.25° C./min, such as from about 25° C./min down to about 0.5° C./min. In some embodiments, the cooling is at a rate of from about 10° C./min down to about 1° C./min. While these rates of cooling can be considered as being fast, the studies reported herein showed cooling assisted by a fan of devices made of exemplar substantially monodisperse particles made by an embodiment of the inventive methods resulted in devices that were stronger than the current commercially available devices to which they were compared, while the DSC study of PEEK sintered and then cooled at 10° C./min showed a crystallization event, which is expected to result in strengthening porous devices made by cooling at that rate. The studies reported herein revealed that porous devices that were cooled slowly were surprisingly stronger than those cooled at rates that were faster. The sintering methods described herein, such as slow heating or slow cooling, are expected to also provide frits and filters made from conventional ground PEEK particles with better resistance to fractures.

The studies reported herein indicate that PEEK frits produced by the inventive methods have much higher fracture resistance than the commercial PEEK frits currently available. As shown in Table 2, these frits did not fracture either axially or radially until subjected to pressures several times that needed to fracture an exemplar commercially available frit. For Agilent SCS Prototype 3, no fracture was observed at 175 MPa pressure axially.

TABLE 2

Comparison Table of Fracture Pressure, Competitors Frits vs Inventive Frits

| Frit | Material | Axial fracture pressure (MPa) | Radial fracture pressure (MPa) |
|---|---|---|---|
| Competitor 1 "0.5 μm" Bio | Sintered PEEK | 25 | 8 |
| Inventive PEEK (SCS Prototype 1) | Sintered PEEK | 47 | 15 |
| InventivePEEK (SCS Prototype 2) | Sintered PEEK | 105 | 23 |
| InventivePEEK (SCS Prototype 3) | Sintered PEEK | >175 | 33 |

Use of the Particles as Packing Materials, and Containers Holding them

In some embodiments, the polyarylketone polymer particles made by the inventive methods can be used as packing materials for separation devices, such as chromatographic columns or solid-phase extraction cartridges, which for these purposes may be considered as containers holding the population of particles.

Studies using PEEK particles as an exemplar polyarylketone polymer revealed that particles made by the inventive methods had surprising properties. First, surprisingly, native, unmodified, solid PEEK particles could be utilized as a chromatographic reverse phase (hydrophobic) media.

Second, surprisingly, despite PEEK's generally accepted bio-inertness, solid PEEK particles could be used to perform useful bio-separations, such as of oligonucleotides and proteins, with a differentiated separatory performance to conventional reverse phase media (e.g. silica particles derivatized with a moiety bearing an 18-carbon alkane chain, sometimes hereafter referred to as "C18" particles, and polystyrene-divinylbenzene particles).

Accordingly, polyarylketone polymer particles, such as PEEK particles, made by the inventive methods allow unique applications as packing materials, or "media," for chromatographic columns and other separation devices, due to their differentiated selectivity from other chromatographic media, their wide pH, chemical and thermal stability, which facilitates usage over a wide range of eluent conditions, their ease of cleaning in place, and their excellent structural stability.

In some embodiments, polyarylketone polymer particles of desired sizes can be used as chromatographic media after being made by the inventive methods by simply packing them into, for example, columns or cartridges. Generally, packing of columns or cartridges without first annealing the particles may be useful for columns or cartridges intended for use in low pressure applications, where the rigidity of the particles is not a factor.

In some examples, however, the particles are annealed prior to use as packing media. Polyarylketone polymer particles, such as PEEK particles, prepared by the inventive methods are semi-crystalline. That crystallinity is, however, disordered, and the particles are ductile. Annealing at increasing temperatures above the glass transition temperature causes melting of the less perfect crystals and almost immediate recrystallization from the melt to give the particles a more uniform, though still semi-crystalline, structure after slow cooling. The annealing process improves the crystal structures within the particles and is believed to make them stronger and more resistant to crushing or deformation.

Pressure vs. flow rate experiments for packed columns showed that increasing annealing time and increasing temperature improved the stability of PEEK particles when packed into a column. Unlike the methods for preparing porous devices described above, however, it is not desired that the particles fuse together, nor that the particles become difficult to re-disperse. Consequently, lower temperatures were used to anneal particles to strengthen them for use as chromatographic media than those used to sinter particles in making porous devices, such as frits. In an example, the annealing is carried out in a furnace for about 4 hours at a temperature of about 285° C., following which the particles are allowed to slowly cool to ambient temperature in the furnace. The temperature may be above the glass transition temperature for the material, such as a polyarylketone, but below the material's onset temperature of melting. Studies conducted with PEEK, however, showed some sintering at temperatures as low as about 300° C. Thus, in examples in which the particles are of PEEK, the particles may be annealed at a temperature of from about 140° C. to about 300° C., ±15° C., such as from about 180° C., ±10° C. to about 290° C., ±10° C. In some examples, the particles may be annealed at a temperature of about 285° C.±15° C., such as at 285° C., ±10° C., or at about 285° C., ±5° C.

As is usual for particles used as packing materials or separation media, particles for these uses are not sintered or otherwise bonded to one another. For clarity, it is again noted that particles intended for use as packing materials can be made surprisingly stronger by heating them above their glass transition temperature, and then cooling them, but the particles are not heated to close to their melting point to bond or sinter the particles to one another, as is done in the formation of the porous devices discussed in some preceding sections.

As shown in the Examples, annealed particles made by the inventive methods, using PEEK as an exemplar of a polyarylketone, and used as packing media in columns were shown to retain good separation characteristics, with both high resolving power, and the ability to withstand analysis conditions (i.e., high pH ion-pairing reagents (>pH 8.0), at elevated temperatures (>60° C.)), while having the better packing, and better performing, separatory columns and cartridges afforded by using substantially spherical particles instead of irregularly shaped particles. Further, as shown in Example 12, when a sample of exemplar particles annealed at different temperatures was placed in a container and subjected to pressure as a measure of the ability of a bed of the particles to withstand pressure, the pellets formed from particles annealed at higher temperatures, but below the point at which they would sinter, showed notably better resistance to compression.

The better packed and performing columns and cartridges extend the time for which columns and cartridges packed with media of such particles can be used, and avoids the cost and inconvenience associated with frequent replacement. PEEK particles allow for more vigorous cleaning conditions to be used than can be used for most other chromatographic media where the columns and cartridges are cleaned in place. This combination of properties makes the particles made by the inventive methods useful for procedures such as ion-pair reversed-phase separation of molecules such as oligonucleotides, that utilize organic solvents and mobile phase additives such as triethylammonium acetate (TEAA) or triethylamine and hexafluoro isopropanol (TEA-HFIP) to ion pair with the molecules being separated, such as the negatively charged phosphodiester backbone of oligonucleotides.

Columns or cartridges packed with solid PEEK particles can be used with liquid chromatography separations of the mobile phases, followed by detection of ultraviolet absorption of the separated solutes ("LC/UV") and by liquid chromatography followed by mass spectrometry analysis ("LC/MS") or other detection of separated analytes. Volatile mobile phases such as triethylamine/HFIP ("TEA/HFIP") can be particularly useful for LC-MS and assist in the characterizations and the determination of sequences of molecules such as oligonucleotides.

Solid, non-porous PEEK particles have fast mass transfer, as there is no porosity or porous layer. Thus, diffusion into and out of the particle structure is not a factor during the separation, in contrast to current fully porous media, or media consisting of a solid core and a porous shell ("superficially porous" media). Thus, non-porous polyarylketone particles are advantageous because they allow for better resolution of the analytes, as well as faster analytical separations and the ability to run more analyses in a workday.

In addition to the separation ability, the ability to withstand harsh conditions, and other useful characteristics noted, above, particles made by the inventive methods of the polyaryletherlketone polymer or thioether-containing analog of the polyaryletherketone polymer are also useful because they can be provided as a population of substantially spherical particles of about the same size, which provides gap sizes and pores that are much more consistent from batch to batch than are populations of irregularly shaped particles made by current techniques. The performance in filtration and particle retention devices made with populations of PEEK particles made by these methods are therefore expected to be more consistent and provide more reproducible results for chromatographic applications. While we are not aware of use of irregularly shaped PEEK particles in chromatography separatory applications, we would expect that the substantially spherical PEEK particles afforded by some embodiments of the present invention would likewise perform better than irregularly shaped particles in such applications.

Example 10 presents the results of studies in which annealed particles of an exemplar polyaryletherlketone polymer, PEEK, made by the inventive methods, were tested as chromatographic media and compared against standard media for their ability to resolve two sets of oligonucleotide standards: an oligonucleotide ladder standard and oligonucleotide resolution standards.

The standards were passed through a column packed with 4.5 μm annealed PEEK particles made by the inventive methods, using two eluants: eluent A, 100 mM triethylammonium acetate ("TEAA") in water and, eluant B, 100 mM TEAA in acetonitrile. Ultraviolet absorption was measured at 260 nm. The results are shown in FIG. 6: the standards were cleanly separated. The same standards were also passed using the same eluants through like columns packed with commercially available media. The results are shown in FIG. 7 (for C18-type media for oligonucleotide separations) and FIG. 8 (porous polystyrene media column). Reviewing the left side of FIG. 6, which shows the separation of the oligonucleotide ladder standards, one sees that the inventive particle media separates the standards into four major peaks, while the left side of FIGS. 7 and 8 reveal that the columns packed with the conventional media under the same gradient conditions both separated them into only three major peaks.

The studies reported in Example 10 and shown in FIGS. 6-8 show that the exemplar annealed PEEK particles under the conditions tested had better separatory performance than either of the conventional reverse phase media.

The studies reported in Example 10 and shown in FIGS. 9 and 10 show that the exemplar inventive annealed PEEK particles succeeded in separating exemplar proteins about as well as rigid, porous poly(styrene/divinylbenzene) particles that are currently one of the choices for such separations.

Further, the inventive methods allow producing substantially monodisperse populations of substantially spherical particles of polyarylketone polymer of preselected diameters that are smaller than are currently commercially available, probably because the current techniques of grinding particles from a larger block and then sizing them results in too much cost in sizing and washing the particles, and creates too many fines. Grinding, sieving and sizing of PEEK particles and compressing the resulting particles into frits, are well known in the art, as exemplified by the Bailey patent, supra.

In some embodiments, the invention provides containers, such as chromatographic columns or solid-phase extraction cartridges, packed with a substantially monodisperse population of substantially spherical particles of polyarylketone polymer of a preselected diameter. In some embodiments, the polyarylketone polymer is a polyaryletherketone. In some embodiments, the polyarylketone polymer is polyaryletheretherketone, or PEEK. In some embodiments, the container is a high-performance liquid chromatography ("HPLC") column. In some embodiments, the container is a desalting column, or a guard column. In some embodiments, the container is a solid-phase extraction cartridge or capillary column. In some embodiments, the capillary column is a liquid chromatography or a gas chromatography column. In some embodiments, the container is a channel or a chamber of a microfluidic device.

In some embodiments, the preselected diameter is about 10 μm, about 9.5 μm, about 9 μm, about 8 μm, about 7 μm, about 6 μm, about 5 μm, about 4 μm, about 3 μm, about 2 μm, about 1.5 μm, about 1 μm, or below 1 μm with "about" in this sentence meaning ±50% of the specified particle size.

EXAMPLES

Example 1

This example sets forth methods used to prepare ketimine monomers and ketimine prepolymer.

4,4'-Difluorobenzophenone (Ketone-Containing Monomer) was Protected as its Ketimine by Condensation with Aniline.

1,000 g 4,4'-difluorobenzophenone was added to a 10 L reactor followed by 3,300 ml dry toluene, 2,000 g 3 Å molecular sieves and 694.12 g aniline. The reaction mixture was stirred at 120° C. (internal) for 48 h with overhead mechanical stirrer under a nitrogen atmosphere. The reaction mixture filtered to remove molecular sieves and filtrate collected. An additional 500 ml of dry toluene was used to wash the collected molecular sieves on the filter plate and this was combined with the original filtrate. The solvent was removed by rotatory evaporation from filtrate until a volume of ca. —600 ml remained. The flask was poured into Pyrex dishes and left covered overnight in a fume hood until yellow crystals formed from the solution. The crystalline product was filtered, washed with 3×50 ml cold dry toluene and dried in a vacuum oven at room temperature. Filtrate from the cold toluene washings was concentrated using a rotatory evaporator and left in fridge overnight to afford a second crop of product. The washing procedure was repeated for second crop and the isolated crystals also dried in a vacuum oven. Again, filtrate from the washings were condensed down and left in fridge overnight to similarly afford a third crop. The washing procedure was repeated for third crop and the crystalline product was dried in vacuum oven. The first crop was recrystallized from a minimum volume of toluene to yield 771.66 g of purified ketimine monomer. The second and third crops were combined and recrystallized from a minimum volume of toluene to yield 101.03 g of purified ketimine monomer. In total 874.69 g of product was obtained.

Preparation of Ketimine Prepolymer

Recrystallized ketimine monomer (600 g, 2.05 mol) was added to a dried 10 L reactor. Hydroquinone (225.258 g, 2.05 mol) was added to the flask, followed by anhydrous potassium carbonate (310.979 g, 2.25 mol)—all vessels were rinsed with minimal volumes of dimethylacetamide to ensure exact mass transfer. Dimethylacetamide (4090 ml) was added to the flask followed by dry toluene (500 ml). The flask was equipped for reflux with a Dean-Stark trap and the equipment insulated (using glass wool wrapped in aluminum foil). The reactor was heated to 150° C. (internal) under a nitrogen atmosphere until all water present had been removed by azeotropic distillation via the Dean-Stark trap. Then the temperature was raised to 155° C. (internal) to distil off the remaining toluene via the Dean-Stark trap. The reaction was then heated to 165° C. (internal) and held at that temperature, taking samples hourly to monitor the molecular weight of the polymer being formed by gel permeation chromatography. Once the polymer had reached the desired molecular weight, the reaction mixture was filtered hot through Whatman #1 filter paper and filtrate was collected and allowed to cool. The polymer was precipitated from the filtrate by dripping 1 L of polymer solution into 4 L of rapidly stirred methanol via a dropping funnel. The polymer was filtered and washed with 3×150 ml methanol, then dried on the filter before further drying under vacuum at 30° C. This process was repeated 4 times to precipitate all the polymer formed in the filtered reaction mixture. The dried crude polymer was completely re-dissolved in 3 L tetrahydrofuran and precipitated a second time at a ratio of 1 L polymer solution into 4 L of rapidly stirred methanol. The polymer was then filtered, washed with 3×150 ml methanol and dried under vacuum at 40° C. This process was repeated 4 times until all the polymer had been reprecipitated, washed and dried. The purified polymer formed was deemed to be greater than 95% purity by $^1$H-NMR spectroscopy.

The results are presented in Table 3.

TABLE 3

| Post toluene distillation-reaction time (h) at 165° C. | Mw |
|---|---|
| 0.00 | 1955 |
| 1.00 | 2494 |
| 2.00 | 3025 |
| 3.16 | 3992 |
| 4.00 | 4901 |
| 5.00 | 6129 |
| 6.00 | 7452 |
| 7.00 | 9120 |
| 8.00 | 12050 |
| 9.00 | 14564 |
| 12.00 | 27748 |

Example 2

This example sets forth methods used to prepare PEEK particles used in studies underlying the present disclosure.

The ketimine-protected polymer (475 g) prepared in the preceding Example was placed in a 20 L Nalgene bottle and dissolved in N-methyl pyrrolidinone (16,625 ml), 760 ml of deionized water was then added and made homogeneous by rolling. The solution was then warmed to 60° C. in a water bath. In a 2 L Nalgene bottle, Tosic acid (12.279 g) was dissolved in N-methyl pyrrolidinone (1,900 ml) by rolling. The acid solution was also heated to 60° C. in a water bath. The acid/N-methyl pyrrolidinone solution was poured into the rapidly stirred ketimine-protected polymer solution at 60° C. The polymer solution was stirred for a further 60 seconds, then allowed to stand without agitation in the water bath at 60° C. for 24 h. The PEEK particles that formed were filtered and washed first with N-methyl-pyrrolidone (1000 ml), then with acetone (1000 ml). The particles were resuspended in acetone (1000 ml) and sonicated in an ultrasonic bath to break up aggregates. The particles were then filtered again and washed with acetone (250 ml) and then dried under vacuum overnight. This process yielded 357.66 g of dried PEEK particles.

To remove any trace residues of N-methyl pyrrolidinone and short chain PEEK oligomers present, portions of the particles were either suspended by agitation in a suitable solvent (e.g. THF), at approximately 8 ml/g of particles and rolled in bottles on a bottle roller for about 48 hours or, alternatively, cleansed by Soxhlet extraction using a suitable solvent (e.g. acetonitrile), with refluxing for approximately 48 hr. After cleaning, the particles were then filtered, washed on the filter with three portions 6 ml/g of the same solvent and dried under vacuum at 40° C. overnight.

Example 3

This example sets forth methods used to prepare PEEK particles used in studies underlying the present disclosure and shows that reducing the ketimine-protected co-polymer concentration in the cleavage reaction mixture significantly improved the particle distribution.

Three samples of ketimine-protected co-polymer (3.333 g, 1.000 g and 0.500 g) prepared as described in Example 1 were placed in 125 ml Nalgene bottles (capacity ~140 ml). Each sample was dissolved by addition of N-methyl pyrrolidinone (116.66 ml). Deionized water (5.333 ml) was then added to each bottle and the solutions were made homogeneous by rolling. The three solutions were then warmed to 60° C. in a water bath.

In each of three 30 ml Nalgene bottles, Tosic acid (86 mg) was dissolved in N-methyl pyrrolidinone (13.333 ml) by rolling. The acid solutions were also heated to 60° C. in a water bath.

Each of the bottles containing one of the ketimine-protected polymer samples had rapidly poured into it one of the acid/N-methyl pyrrolidinone solutions at 60° C. The resulting polymer solutions were agitated in the heating batch for a further 60 seconds at 100 rpm, then allowed to stand without agitation in the water bath at 60° C. for 18 h. In each bottle PEEK particles had formed. For each bottle, the particles were vacuum filtered onto a double layer #1 Whatman® filter papers using a 47 mm diameter Whatman® glass demountable filter funnel and then washed on the filter, first with N-methyl-pyrrolidone (30 ml), then twice with acetone (30 ml). The particles were resuspended in acetone (30 ml) and sonicated in an ultrasonic bath for 10 minutes to break up loose aggregates. The particles were then filtered again, washed on the filter with acetone (30 ml), then dried in under vacuum overnight. The particle distributions for the three samples were then analyzed by the Coulter principle on a Beckman Coulter Multisizer 3 Coulter Counter.

The Coulter traces obtained are shown in FIG. 14. All three reactions described had utilized identical conditions except that the weight, and thus the concentration, of the ketimine co-polymer present in the reaction mixture was varied.

The grey Coulter trace shows the result for the highest concentration of polymer (24.6 g/L of reaction mixture) and exhibits its main peak at ~7.2 μm and a tail from ~7.8 μm to ~13.5 μm. The dotted Coulter trace shows the result for an intermediate polymer concentration (7.39 g/L of reaction mixture) and exhibits a much larger peak at ~5.6 μm and a reduced size of tail from ~6.0 μm to ~8.3 μm. The solid black Coulter trace shows the result for the lowest concentration of ketimine co-polymer (3.69 g/L of reaction mixture) and shows a similar sized peak at ~5.6 μm as the intermediate concentration example but with a further reduced tail component running from ~6.2 μm to ~7.8 μm.

Example 4

This example sets forth methods of forming PEEK particles into fits using a bolt press.

A commercial FTIR ⅜" bolt press was used to form uniform, PEEK particles into frit-type structures: A small sample, ca. 200 mg of 2.5 μm particles was loaded into the die and the two nuts were tightened evenly with spanners (wrenches) to compress the sample. Then the die assembly containing the PEEK particles was placed in a furnace, heated at 10° C. per minute up to 340° C. then held at temperature for 4 hours, before being allowed to cool to ambient temperature overnight. The die assembly was disassembled, and the annealed PEEK pellet was carefully removed and examined by SEM.

Example 5

This example sets forth a study of forming PEEK particles into frits using a 13 mm pellet press die and a manual hydraulic press wherein the porosity of the frit is controlled by the force applied.

A sample (ca. 140 mg) of ca. 4.2 μm diameter, uniform, PEEK particles was weighed and distributed evenly on the lower anvil inside the base of a 13 mm pellet press die (as used for forming KBr pellets for FTIR). An upper anvil was placed above the sample. Force was applied via a plunger with a manual hydraulic press to compact the heterogeneously crystalline PEEK particle "cake" within the die to a set level. The greater the force applied the greater the density of compressed particles in the particle "cake," and thus the lower the porosity of the final annealed frit. The force within the die was released and the anvils were pushed out of the die. The compressed particle cake was separated from the anvils, placed in a quartz glass basin, and placed in a furnace. The furnace was heated at 10° C. per minute up to 340° C. and then held at temperature for 6 hours before being allowed to cool back to ambient temperature naturally. The frit was then removed from the quartz basin for testing. Later studies were performed in which the frits were formed the same way but sintered at 335° C. for 4 hours.

Example 6

This example sets forth a study of forming PEEK particles into frits using a 13 mm pellet press die and a manual hydraulic press wherein the size and volume of the frit were constrained by the internal dimensions of the pellet die (with the lower anvil in situ), in conjunction with a spacer used to restrict the maximum travel of the upper anvil such that a fixed volume void remained independent of any additional force applied by the press following compression. In this study, the porosity of the frit was controlled by varying the mass of particles utilized that were compressed within that fixed volume.

A sample (614.7 mg) of ca. 8.0 μm diameter, uniform, PEEK particles was weighed and distributed evenly on the lower anvil inside the base of a 13 mm pellet press die (as used for forming KBr pellets for FTIR). An upper anvil was placed above the sample. A spacer was used to restrict the travel of the plunger so that upper anvil could not be compressed further than a height of 7.2 mm above the lower anvil. Force was applied via a plunger with a manual hydraulic press to compact the heterogeneously crystalline PEEK particle "cake" within the die as far as possible (up to the restricted limit of travel of the plunger). The force within the die was released and the anvils were pushed out of the die. The compressed particle cake was separated from the anvils, placed in a quartz glass basin, and placed in a furnace. The furnace was heated at 10° C. per minute up to 340° C. and then held at temperature for 8 hours before being allowed to cool back to ambient temperature naturally. The frit was then removed from the quartz basin for testing.

Example 7

The process is similar to that of the previous Example, except a 3-part 52×52 mm square press, machined from aluminum, was used in place of the stainless-steel die/anvils/plunger. A small, 42.5 mm square raised (~1 mm) platform was used inside the press so that the edges of the pressed particles were less compressed and did not adhere to the side of the mold, allowing for a damage-free release of a 42.5 mm square pressing. Typically, ca. 1.4 g of 4.2 μm particles was spread as evenly as possible over the base of the mold before pressing. The pressed frit could be easily released from the platform and transferred to a quartz dish for sintering in a furnace as in the previous Example.

Example 8

This Example sets forth methods of frit preparation and bubble point testing.

Laser Cutting: The frit samples were cut into 2.15 mm diameter discs using a UV laser system.

Frit Preparation in 2.1×50 mm columns: The 2.15 mm diameter PEEK fits were press-fit into carbon-loaded PEEK rings with thickness similar to the PEEK frits and outer diameter appropriate for mounting in a high-performance, 2.1 mm format chromatography column. Any gaps between the porous elements and the mounting rings close-up when the rings were compressed as the columns were sealed during column packing and assembly. The exemplar sintered PEEK materials (coded PF15 and PF16 in these studies) were much more robust than commercial PEEK porous elements. Unlike the commercial PEEK porous elements tested, the frits laser cut from PF15 and PF16 sintered PEEK materials showed no tendency to fragment during handling or compression and the bulk integrity of the materials was maintained.

Bubble Testing: Two examples from each material (PF15 and PF16) were quantitatively tested by forcing nitrogen through the samples after they were thoroughly saturated in isopropyl alcohol. The pressure at which bubbles first appear indicated the approximate size of the largest through-holes in each sample. The four samples had bubble-point pressures from 11-14" Hg, with permeabilities from $0.7\text{-}1.5\times10^{-14}$ $m^2$, suggesting an effective pore size of roughly 1 μm and flow capacities similar to current "Grade 0.2 μm" sintered stainless-steel frits. For reference, competitor stainless-steel sintered frits have bubble-point pressures around 7" Hg and permeabilities around $1.5\times10^{-14}$ $m^2$. Bubble-point tests showed uniform bubbling, with the whole surface conducting.

Table 4 presents bubble-point test results of commercially available PEEK frits and stainless-steel frits from several providers, and exemplar frits made by the inventive methods. As shown in Table 4, PEEK frits produced by the inventive methods have much larger flow capacities (higher permeability) than commercial frits of similar bubble point pressures. One example shows an order of magnitude difference. The inventive frits also had much smaller effective pore sizes than that are currently available from commercial vendors. In one example, the inventive frit had an effective pore size of less than 0.5 μm.

TABLE 4

| Frit | Material | Fabrication | Bubble-point pressure ["Hg] | Permeability [$m^2$] |
|---|---|---|---|---|
| Competitor 1 "0.5 μm" Bio | PEEK | Sintered | 2 | $6.0 \cdot 10^{-14}$ |
| Agilent PEEK (Prototype 1) | PEEK | Sintered | 2.5 | $2.0 \cdot 10^{-13}$ |
| Competitor 1 "0.5 μm" | Stainless steel | Sintered | 3.7 | $4.5 \cdot 10^{-14}$ |
| Agilent PEEK (Prototype 2) | PEEK | Sintered | 3.8 | $2.8 \cdot 10^{-13}$ |
| Competitor 1 "0.2 μm" Bio | PEEK | Sintered | 4.5 | $2.0 \cdot 10^{-14}$ |
| Agilent PEEK (Prototype 3) | PEEK | Sintered | 4.7 | $2.6 \cdot 10^{-13}$ |
| Competitor 2 for STM media | Stainless steel | Sintered | 7 | $1.5 \cdot 10^{-14}$ |
| Agilent PEEK (Prototype 4) | PEEK | Sintered | 7 | $6.0 \cdot 10^{-14}$ |
| Competitor 3 | Stainless steel | Sintered | 8 | $1.0 \cdot 10^{-14}$ |
| Agilent PEEK (Prototype 5) | PEEK | Sintered | 8 | $4.5 \cdot 10^{-14}$ |
| Agilent PEEK (Prototype 6, PF16) | PEEK | Sintered | 13 | $1.0 \cdot 10^{-14}$ |
| Agilent PEEK (Prototype 7) | PEEK | Sintered | 30 | $2.0 \cdot 10^{-15}$ |

Example 9

This Example sets forth a test of HPLC performance of exemplar frits made from 5 populations of PEEK particles made by the inventive methods.

HPLC Performance An IDEX Isobar column and one column each of the PF15 and PF16 sintered PEEK frits were packed and tested. All three columns were 2.1×50 mm format, packed with Zorbax 1.8 μm Eclipse C18 media, using process parameters optimized for sintered stainless-steel frit. The columns were tested with a uracil and naphthalene sample mix and (55:45) water-acetonitrile mobile phase on two different HPLC systems. The test results are shown in Table 5.

TABLE 5

| | LC System 1 | | | | | LC System 2 | | | | |
|---|---|---|---|---|---|---|---|---|---|---|
| Column Column | p [bar] | $t_R$ [min] | USP Plates | | USP Tailing | p [bar] | $t_R$ [min] | USP Plates | | USP Tailing |
| Iso bar Stainless Steel | 400 | 1.13 | 10975 | ±584 | 1.0 | 407 | 1.16 | 10461 | ±200 | 1.1 |
| Agilent PF16 | 460 | 1.14 | 11091 | ±194 | 1.0 | 413 | 1.16 | 10137 | ±91 | 1.2 |
| Agilent PF15 | 448 | 1.14 | 10677 | ±365 | 1.0 | 403 | 1.15 | 10063 | ±108 | 1.2 |

Example 10

This Example sets forth studies of the separation of oligonucleotide standards on columns packed with solid, native (non-derivatized, no additives) PEEK particles (that is, PEEK that had not been derivatized or containing additives) and comparative separation examples for superficially porous C18-silca particles and porous polystyrene particles.

Solid PEEK particles (4.5 μm diameter) were annealed in a furnace at 250° C. for 5 hours and then allowed to cool overnight. The particles were slurried in 5 ml methanol at ca. 50 mg/ml, sonicated to disperse them, and loaded using constant pressure apparatus at 250-300 bar into 2.1×50 mm stainless steel columns (IDEX Isobar style) fitted with 2.0 μm stainless steel frits. (As practitioners will appreciate, the "2.1 mm" denotes the inner diameter of the column, and the "150 mm" states the length. A 2.1 mm inner diameter column allows for lower solvent use compared to a column with a larger diameter, while a 150 mm column is used to provide increased resolution compared to shorter columns, at the cost of a longer separation time).

Two sets of oligonucleotide standards were used: Agilent p/n 5190-9028 RNA resolution standard, oligos at 14, 17, 20, and 21-mer, and Agilent p/n 5190-9029 DNA ladder standard, oligos at 15, 20, 25, 30, 35, and 40-mer. The standards were passed through a column packed with 4.5 μm annealed PEEK particles as described in the preceding paragraph, at a temperature of 65° C. Two eluants were used: eluent A, 100 mM triethylammonium acetate (TEAA) in water and, eluant B, 100 mM TEAA in acetonitrile, using the method shown in FIG. 6. Ultraviolet absorption was measured at 260 nm.

The results are shown in FIG. 6. The oligonucleotide resolution standards are seen on the X axis of FIG. 6 at times 6-9.5 minutes, while the oligonucleotide ladder standards are seen on the X axis of FIG. 6 at times 12-16 minutes.

Table 6 shows the conditions used for a study of separating oligonucleotide standards using a 5-20% acetonitrile gradient. (Referring to Table 6, it is noted that the "Flow" and "Max. Pressure Limit [bar]" columns are not shown for all, rows as those conditions remained the same throughout the separations.) Much shallower gradients are normally required to obtain similar levels of resolution to those seen for the columns packed with solid PEEK particles. In particular, the third and fourth peaks of the resolution standard are typically unresolved under these conditions on reversed phase columns.

TABLE 6

| Time [min] | A[%] | B[%] | Flow [mL/ min] | Max. Pressure Limit [bar] |
|---|---|---|---|---|
| 0.00 | 95.00 | 5.00 | 0.21 | 500.00 |
| 15.00 | 80.00 | 20.00 | | |
| 17.00 | 10.00 | 90.00 | | |
| 20.00 | 1.00 | 90.00 | | |
| 22.00 | 95.00 | 5.00 | | |
| 35.00 | 95.00 | 5.00 | | |

As shown on FIG. 6, however, the inventive annealed PEEK particles were able to resolve these closely eluting species under the same conditions, and yet run at very low back pressures, enabling faster flow rates, and faster analyses. Thus, in this study, the inventive annealed PEEK particles gave improved resolution compared to conventional media.

To provide another comparison of the resolution achieved by conventional media to that of the inventive annealed PEEK particles, the same oligonucleotide standards were run on a column of the same size, using the same eluants, but with the column packed instead with particles of 2.7 μm superficially porous particles chemically modified to make them highly resistant to high pH mobile phases and bonded to an end-capped C18 phase highly selective for oligonucleotides (FIG. 7) and by reverse phase on a column of the same size, with 8 μm fully porous particles. (FIG. 8). As can be seen by comparing FIGS. 6 and 7, the inventive annealed PEEK particles provide better resolution of oligonucleotides than particles derivatized with a C18 alkane providing high selectivity for oligonucleotides. Comparing FIGS. 6 and 8 shows that the underivatized, solid inventive particles can surprisingly be utilized as a reverse phase (hydrophobic) media.

Example 11

This Example sets forth studies of the separation of proteins on columns packed with solid native PEEK particles and comparative separation examples using porous polystyrene particles.

A 2.1×150 mm column was packed with solid PEEK particles with a diameter of 4.5 μm as described in Example 9, except that the particles were annealed for 6 hours. The column was tested for its ability to separate proteins. Table 7 shows the chromatographic method used for the separation: The first column shows the run time in minutes, the second and third columns show the composition of eluant A (0.1 vol % trifluoroacetic acid in aqueous) and of eluant B (0.1 vol % trifluoroacetic acid in acetonitrile) by volume % at the given time. The composition of eluants A and B flowing through the column changes smoothly via a linear gradient between any two consecutive time points (rather than being step changes).

TABLE 7

| Time [min] | % A (0.1% TFA in water) | % B (0.1% TFA in acetonitrile) |
|---|---|---|
| 0 | 80 | 20 |
| 20 | 20 | 80 |
| 25 | 20 | 80 |
| 26 | 80 | 20 |
| 36 | 80 | 20 |

FIG. 9 shows the separation of uracil and of four different proteins run through the PEEK media. Uracil is used as an unretained analyte to show the "dead volume" of the column and system from the injection. This represents the time it takes from injection (t=0) for a sample to run through the instrument and column to the detector, shows the flow rate of the system, and can be referenced to other peaks to compare with later runs at different flow rates. Peaks are listed in order of elution.

FIG. 10 shows the separation of uracil and four proteins run under the same conditions as those of FIG. 9, but through PLRP-S media, a conventional media of fully porous, rigid, poly(styrene/divinylbenzene) particles, in this case, particles of 8 μm diameter and pores of 300 Å. A comparison of FIG. 9 and FIG. 10 shows that the solid, inventive PEEK particles have broader applicability in bioseparations and can surprisingly be used to separate proteins in a manner similar to conventional porous polymeric (polystyrene) particles.

Example 12

This Example sets forth the results of studies comparing the fracture strength of exemplar porous devices made by shaping PEEK particles into the shape of the device, sintering the particles, and then cooling them by either of two methods.

PEEK particles were pressed into frits with a 2.1 mm diameter mold. One set of the compressed exemplar frits was heated in a modified gas chromatography ("GC") oven and sintered at 335° C. for 4 hours, and then cooled using the oven's forced air circulation at 50° C./min. The second set of identical compressed PEEK frits were heated in an insulated furnace to sinter at the same temperature, for the same time, but then cooled slowly overnight in the furnace. Frits made by the two methods, either laser cut to a 2.1 mm diameter or directly pressed to size of 2.1 mm) and a control set of commercially available 2.1 mm PEEK frits, were then tested for their resistance to axial and diameter compression.

Axial crush data were generated using an Instron instrument using two large anvils with the porous devices placed on one of their circular faces near the center of the lower anvil. Table 8 present the axial crush test results.

TABLE 8

| Sample | Mean Failure Axial Pressure [Mpa] |
|---|---|
| Commercial PEEK Frit | 24 |
| Agilent Prototype PEEK Frit Forced cooling after sintering | 32 |
| Agilent Prototype PEEK Frit Slow cooling after sintering | 60 |

Radial crush data were generated using an Instron instrument using two large anvils with the porous devices balanced on the cylindrical edge between the anvils. Table 9 and present the axial crush test results.

TABLE 9

| Sample | Mean Failure Diameter Pressure [Mpa] |
|---|---|
| Commercial PEEK Frit | 8 |
| Inventive prototype PEEK frit forced cooling after sintering | 14 |
| Inventive prototype PEEK frit slow cooling after sintering | 26 |

As can be seen by comparing the results, PEEK particles made by embodiments of the inventive methods and cooled by forced cooling showed strength notably greater than that of the commercially available frit. As can further be seen, slow cooling of the exemplar porous devices dramatically and surprisingly increased their resistance to fracturing when subjected to either axial or diameter crush forces compared to the commercially available frits.

Example 13

This Example sets forth the results of crush test experiments showing that PEEK particles annealed at high temperatures, but below those used for sintering, had better resistance when subjected to pressure, analogous to being packed into a column.

PEEK particles were either left unannealed, or were annealed for equal times in a furnace at one of the following temperatures: 155, 200, 245, 255, and 285° C., respectively, and then allowed to cool in the furnace overnight. A sample of 0.05 g of 5 μm PEEK particles from each group was then tested by being placed between anvils within a high strength steel 4 mm diameter pellet press die using a Mark-10 ESM-303 test stand, and subjected to Force Gauge compressing at a rate of 0.5 mm/min.

The results are shown in FIG. 13. FIG. 13 presents curves showing the force generated on compression of a pellet of the PEEK particles from each of the test groups described in the preceding paragraph. As can be seen in FIG. 13, all of the annealed PEEK particles were stronger than unannealed particles, and higher temperatures (below temperatures at which the particles would sinter) produced particles that were stronger than particles annealed at lower temperatures. Annealing the particles at 285° C. produced particularly good results.

Example 14

This Example sets forth analyses of monoclonal antibodies ("mAbs") on liquid chromatography columns packed with solid PEEK particles or, for comparison, with a commercially available media, PLRP-S, comprised of porous polystyrene particles.

A 2.1×50 mm liquid chromatography column was packed with solid PEEK particles having a diameter of 2.7 μm. The column was tested for its ability to separate mAbs. Tables 10, 11 and 12 show the chromatographic methods used for the separation on PEEK particles as the stationary phase in the column (Tables 10 and 11) and, as a comparison, on a column containing packed with porous polystyrene-divinyl benzene media (Table 12). The first column of each of Tables 10, 11, and 12 shows the run time in minutes, the second and third columns show the composition of eluant A (0.1 vol % trifluoroacetic acid, or "TFA," in aqueous solution) and of eluant B (0.1 vol % TFA in acetonitrile) by volume % at the given time. The composition of eluants A and B flowing through the column changes smoothly via a linear gradient between any two consecutive time points (rather than being step changes).

FIG. 15 shows a chromatogram for a ~1 mg/ml sample of an exemplar monoclonal antibody, ramucirumab, run through a liquid chromatography column packed with PEEK 2.7 μm non-porous media at 80° C. with a flow rate of 0.21 ml/min (~43 bar column pressure), with UV detection at 220 nm. The chromatogram shows that the exemplar monoclonal antibody was retained on a liquid chromatography column using solid PEEK particles as the stationary phase. X axis: time, in minutes. Y axis: UV absorbance at 220 nm, in milli Absorbance units ("mAu"). Table 10 summarizes the chromatographic conditions used in this study.

TABLE 10

| Time [min] | % A (0.1% TFA in water) | % B (0.1% TFA in acetonitrile) |
|---|---|---|
| 0 | 62.5 | 37.5 |
| 6.0 | 57.5 | 43.5 |
| 7.0 | 57.5 | 43.5 |
| 8.0 | 62.5 | 37.5 |
| 10.0 | 62.5 | 37.5 |

Studies were performed to compare the ability of media made of PEEK particles to retain detect monoclonal antibodies to standard media. FIG. 16 shows a chromatogram for ~1 mg/ml sample of an exemplar monoclonal antibody, ramucirumab, run through a liquid chromatography column packed with a commercially available media, PLRP-S 5 μm porous 1000 Å media, a rigid macroporous styrene/divinylbenzene (PS/DVB) HPLC phase. The sample was run at 80° C. with a flow rate of 0.21 ml/min (~38 bar column pressure), with UV detection at 220 nm. Table 11 summarizes the chromatographic conditions used in this study.

TABLE 11

| Time [min] | % A (0.1% TFA in water) | % B (0.1% TFA in acetonitrile) |
|---|---|---|
| 0 | 65.5 | 34.5 |
| 6.0 | 59.5 | 40.5 |
| 7.0 | 59.5 | 40.5 |
| 8.0 | 65.5 | 34.5 |
| 10.0 | 65.5 | 34.5 |

Reviewing FIGS. 15 and 16 shows that the inventive PEEK particles retain and separate important therapeutic biomolecules, such as monoclonal antibodies, as well as currently available porous polymeric (polystyrene) particles.

FIG. 17 is a chromatogram for ~1 mg/ml sample of exemplar monoclonal antibody, ramucirumab, run through a liquid chromatography column packed with the inventive PEEK solid media at 80° C. with a flow rate of 2.1 ml/min (~400 bar column pressure), with UV detection at 220 nm. The main peak for the ramucirumab sample is seen eluting at between 0.33 and 0.46 minutes. The minor peak to the left is due to the refractive index of the solvent used for the injection. X axis: time, in minutes. Y axis: UV absorbance at 220 nm, in mAU. Table 12 summarizes the chromatographic conditions used in this study.

TABLE 12

| Time [min] | % A (0.1% TFA in water) | % B (0.1% TFA in acetonitrile) |
|---|---|---|
| 0 | 62.5 | 37.5 |
| 0.6 | 57.5 | 43.5 |
| 0.75 | 57.5 | 43.5 |
| 0.80 | 62.5 | 37.5 |
| 1.0 | 62.5 | 37.5 |

The results shown in FIG. 17 demonstrate that the inventive PEEK particles are extremely strong and can be used as media with very high flow rates for fast separations of biomolecules, such as monoclonal antibodies (less than one minute, compared to the more than three minutes required for a column loaded with PLRP-S media). Columns packed with media such as PLRP-S cannot be used for separating biomolecules at flow rates as high as that used with the inventive PEEK media because the maximum column pressure would be exceeded.

FIG. 18 shows overlaid chromatograms for three monoclonal antibodies: ramucirumab, bevacizumab and NIST mAb run under the same conditions as those used in the study that resulted in FIG. 17, demonstrating the capability of the PEEK media to separate three different antibodies. (NIST mAb is a reference monoclonal antibody available from the National Institute for Standards and Technology used as a standard control for antibody characterization).

FIG. 19 shows chromatograms allowing comparison of a fast separation of an exemplar mAb, ramucirumab, run through a liquid chromatography column packed with the inventive PEEK media versus a separation of the same mAb run through a liquid chromatography column packed with PLRP-S media. The chromatogram on the left side of FIG. 19 is from a sample containing ramucirumab run on a 2.1 mm diameter×50 mm length column of 2.7 μm solid PEEK media at 2.1 ml/min. The chromatogram on the right side of FIG. 19 shows a run of the same mAb on 5 μm 1000 Å porous PLRP-S media, run at a typical 0.21 ml/min flow rate.

The results of the studies set forth in this Example show, surprisingly, that the inventive media, which provides uniformly sized, spherical, non-porous PEEK particles, can separate biomolecules as well as commercially available polystyrene porous particles. Further, the results show that the inventive media of non-porous PEEK particles can do analyses at faster flow rates than can polystyrene porous particles, allowing quicker sample turn-around due to the high mechanical strength and, thus, high pressure stability of PEEK particles made by the inventive methods. Quicker sample turn-around provides a number of advantages to the practitioner, including the ability to accomplish more runs in the course of a workday.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A monodisperse population of particles of a polyarylthioetherketone polymer comprising a substantially spherical shape having a selected diameter of from about 1 micron to about 10 microns, wherein said particles of polyarylthioetherketone polymer are substantially free of stabilizer and are substantially free of fines.

2. The monodisperse population of particles of claim 1, wherein said particles are configured for use in a liquid chromatography column.

3. The monodisperse population of particles of claim 1, wherein said particles are configured for use in a solid-phase extraction cartridge or capillary column.

* * * * *